United States Patent
Katayama et al.

(10) Patent No.: US 10,121,040 B2
(45) Date of Patent: Nov. 6, 2018

(54) RECOGNITION APPARATUS, RECOGNITION METHOD, STORAGE MEDIUM, MANAGEMENT SYSTEM, AND CONVEYANCE SYSTEM

(71) Applicants: Hiroshi Katayama, Kanagawa (JP); Koichi Kudo, Kanagawa (JP); Toshihiro Okamoto, Kanagawa (JP); Tamon Sadasue, Kanagawa (JP); Ken Oikawa, Kanagawa (JP); Hanako Bando, Tokyo (JP); Daisuke Maeda, Kanagawa (JP)

(72) Inventors: Hiroshi Katayama, Kanagawa (JP); Koichi Kudo, Kanagawa (JP); Toshihiro Okamoto, Kanagawa (JP); Tamon Sadasue, Kanagawa (JP); Ken Oikawa, Kanagawa (JP); Hanako Bando, Tokyo (JP); Daisuke Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/497,500

(22) Filed: Apr. 26, 2017

(65) Prior Publication Data

US 2017/0316241 A1    Nov. 2, 2017

(30) Foreign Application Priority Data

Apr. 28, 2016    (JP) .................................. 2016-091741

(51) Int. Cl.
*G06K 7/14*    (2006.01)

(52) U.S. Cl.
CPC ......... *G06K 7/1443* (2013.01); *G06K 7/1456* (2013.01)

(58) Field of Classification Search
None
See application file for complete search history.

(56) References Cited

U.S. PATENT DOCUMENTS

2016/0267312 A1*    9/2016   Vasic ................... G06K 7/1417

FOREIGN PATENT DOCUMENTS

JP    2-151984    6/1990
JP    2008-287414    11/2008

* cited by examiner

*Primary Examiner* — Kristy A Haupt
(74) *Attorney, Agent, or Firm* — Duft & Bornsen, PC

(57) ABSTRACT

A recognition apparatus includes one or more processors, a memory to store a plurality of instructions which, when executed by the processors, cause the processors to extract an optically-readable symbol from an optically captured image including an image of the optically-readable symbol, the optically-readable symbol including a first cell line having a plurality of first cells, and one or more second cell lines each having one or more second cells, each of the one or more second cell lines connected to respective ones of the plurality of first cells of the first cell line, recognize first information expressed by the first cell line included in the extracted optically-readable symbol, recognize second information expressed by the one or more second cell lines included in the extracted optically-readable symbol, and acquire identification information included in the optically-readable symbol based at least in part on the first information and the second information.

18 Claims, 23 Drawing Sheets

FIG. 4A
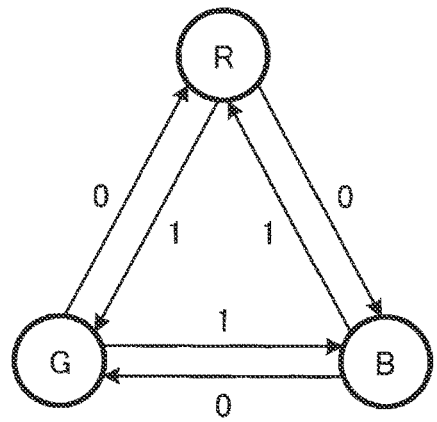
FIG. 4B
FIG. 4C
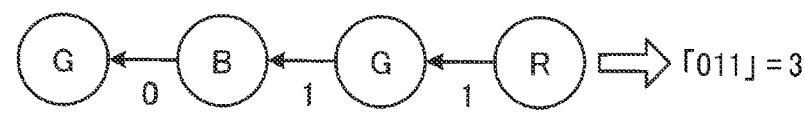
FIG. 4D
|  | 0 | 1 |
|---|---|---|
| R | B | G |
| G | R | B |
| B | G | R |

FIG. 7A
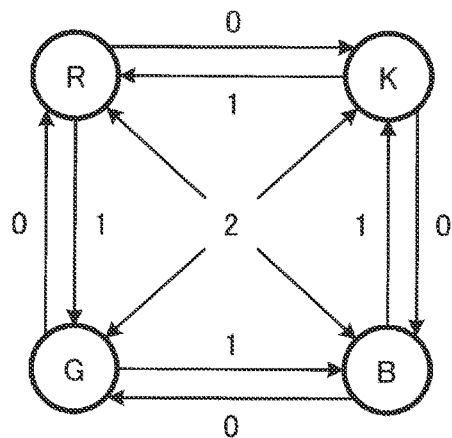
FIG. 7B
FIG. 7C
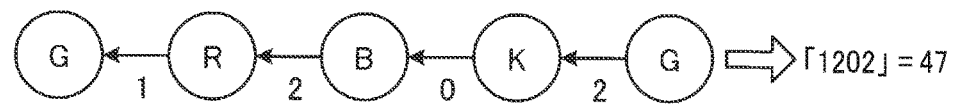
FIG. 7D
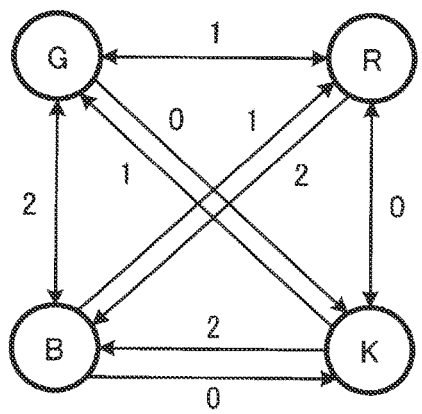
FIG. 7E
|   | 0 | 1 | 2 |
|---|---|---|---|
| R | K | G | B |
| G | K | R | B |
| B | K | R | G |
| K | R | G | B |

| CONNECTION INFORMATION OF CELLS |
|---|
| (LABEL #1, LABEL #2) |
| (LABEL #5, LABEL #2) |
| (LABEL #3, LABEL #9) |
| (LABEL #1, LABEL #3) |
| (LABEL #1, LABEL #S) |
| (LABEL #8, LABEL #4) |
| (LABEL #3, LABEL #6) |
| (LABEL #6, LABEL #7) |
| (LABEL #9, LABEL #4) |
| (LABEL #9, LABEL #E) |

| CONNECTION NUMBER SET FOR EACH CELL |
|---|
| LABEL #1 = 3 |
| LABEL #2 = 2 |
| LABEL #3 = 3 |
| LABEL #4 = 2 |
| LABEL #5 = 1 |
| LABEL #6 = 2 |
| LABEL #7 = 1 |
| LABEL #8 = 1 |
| LABEL #9 = 3 |

| CONNECTION PATTERN |
|---|
| STEM: LABEL #1 ⇔ #3 ⇔ #9 |
| BRANCH: LABEL #2 ⇔ #5, #4 ⇔ #8, #6 ⇔ #7 |

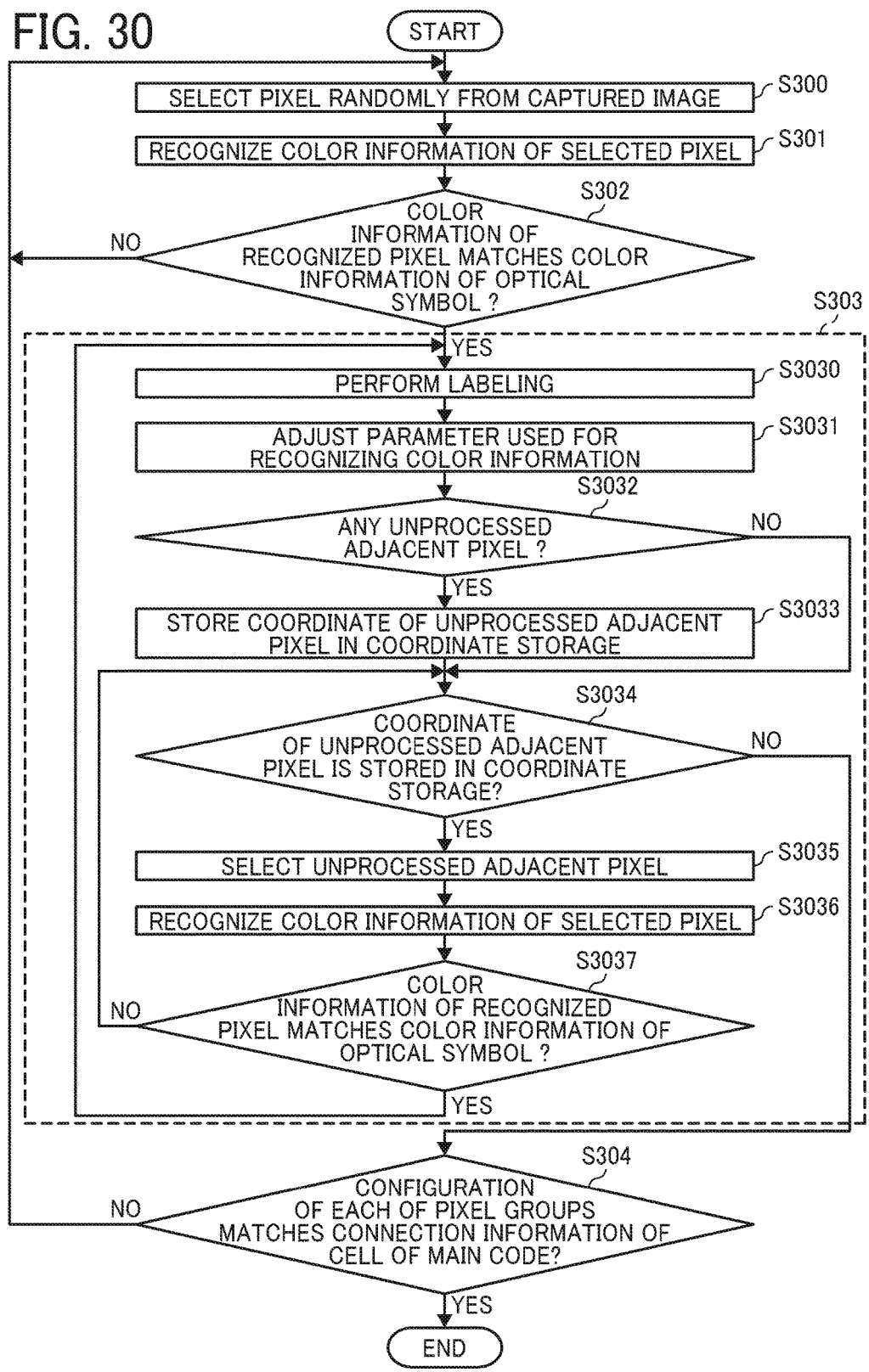

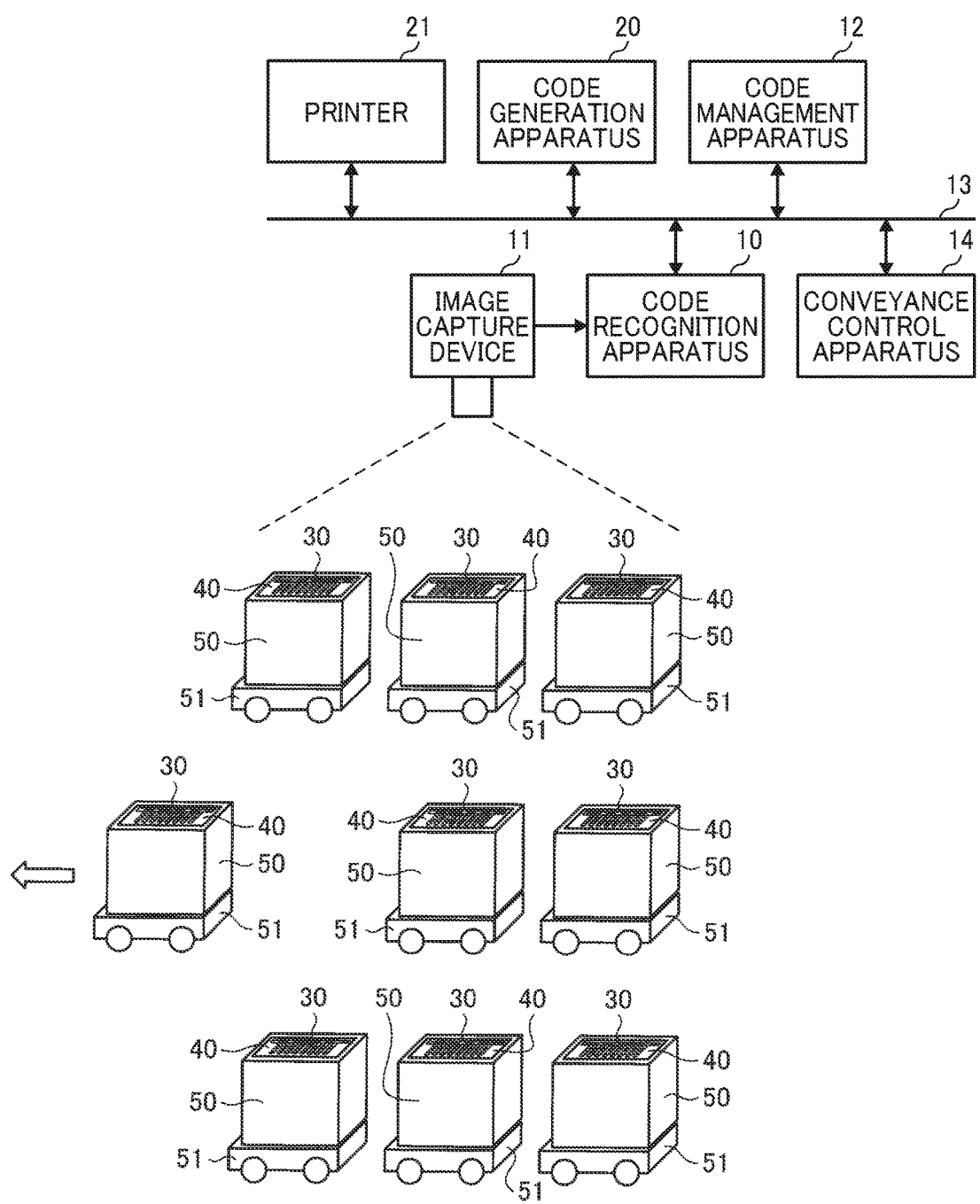

RECOGNITION APPARATUS, RECOGNITION METHOD, STORAGE MEDIUM, MANAGEMENT SYSTEM, AND CONVEYANCE SYSTEM

CROSS-REFERENCE TO RELATED APPLICATION

This application claims priority pursuant to 35 U.S.C. § 119(a) to Japanese Patent Application No. 2016-091741, filed on Apr. 28, 2016 in the Japan Patent Office, the disclosure of which is incorporated by reference herein in its entirety.

BACKGROUND

Technical Field

This disclosure relates to a recognition apparatus, a recognition method, a storage medium, a management system, and a conveyance system.

Background Art

Two-dimensional codes such as QR code (registered trademark) using binary information have been used in many application fields. When a camera captures an image of a two-dimensional code, information such as identification (ID) can be acquired. To increase information amount stored in the two-dimensional codes, two-dimensional codes using a plurality of colors (two-dimensional color codes) that increase storing information amount per unit area have been used instead of monochrome binary information. The two-dimensional color codes are configured by encoding a plurality of colors with a specific arrangement pattern, and further by encoding a color transition between adjacent segments to enhance the distortion durability of two-dimensional color codes as disclosed in JP-2008-287414-A. However, the recognition processing speed of such two-dimensional codes tends to be relatively slow, as the recognition processing is hardly performed concurrently.

SUMMARY

As one aspect of present disclosure, a recognition apparatus is devised. The recognition apparatus includes one or more processors, a memory configured to store a plurality of instructions which, when executed by the one or more processors, cause the one or more processors to extract an optically-readable symbol from an optically captured image including an image of the optically-readable symbol, the optically-readable symbol including a first cell line having a plurality of first cells, and one or more second cell lines each having one or more second cells, each of the one or more second cell lines connected to respective ones of the plurality of first cells of the first cell line, recognize first information expressed by the first cell line included in the extracted optically-readable symbol, recognize second information expressed by the one or more second cell lines included in the extracted optically-readable symbol, and acquire identification information included in the optically-readable symbol based at least in part on the recognized first information and the recognized second information.

As another aspect of present disclosure, a method of recognizing optically-readable information is devised. The method includes extracting an optically-readable symbol from an optically captured image including an image of the optically-readable symbol, the optically-readable symbol including a first cell line having a plurality of first cells, and one or more second cell lines each having one or more second cells, each of the one or more second cell lines connected to respective ones of the plurality of first cells of the first cell line, recognizing first information expressed by the first cell line included in the extracted optically-readable symbol, recognizing second information expressed by the one or more second cell lines included in the extracted optically-readable symbol, and acquiring identification information included in the optically-readable symbol based at least in part on the recognized first information and the recognized second information.

As another aspect of present disclosure, a non-transitory storage medium storing a program that, when executed by a computer, causes the computer to execute a method of recognizing optically-readable information is devised. The method includes extracting an optically-readable symbol from an optically captured image including an image of the optically-readable symbol, the optically-readable symbol including a first cell line having a plurality of first cells, and one or more second cell lines each having one or more second cells, each of the one or more second cell lines connected to respective ones of the plurality of first cells of the first cell line, recognizing first information expressed by the first cell line included in the extracted optically-readable symbol, recognizing second information expressed by the one or more second cell lines included in the extracted optically-readable symbol, and acquiring identification information included in the optically-readable symbol based at least in part on the recognized first information and the recognized second information.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 4A illustrates an example of an encoding procedure for setting a binary number by using three colors such as red (R), green (G) and blue (B);

FIG. 4B illustrates an example of a cell line composed of a plurality of cells;

FIG. 4C illustrates another example of a cell line composed of a plurality of cells;

FIG. 4D illustrates an example of a conversion table that correlates color transition and values set for the encoding procedure of FIG. 4A;

FIG. 7A illustrates an example of an encoding procedure by using four colors of red (R), green (G), blue (B), and black (K);

FIG. 7B illustrates an example of a cell line composed of a plurality of cells;

FIG. 7C illustrates another example of a cell line composed of a plurality of cells;

FIG. 7D illustrates another example of an encoding procedure by using four colors of red (R), green (G), blue (B), and black (K);

FIG. 7E illustrates an example of a conversion table that correlates color transition and values set for the encoding procedure of FIG. 7A;

FIG. 30 is an example of a flow chart illustrating steps of a second extraction process of the first embodiment;

FIG. 32 schematically illustrates a code management system and a conveyance system of a second embodiment.

Figure 1:
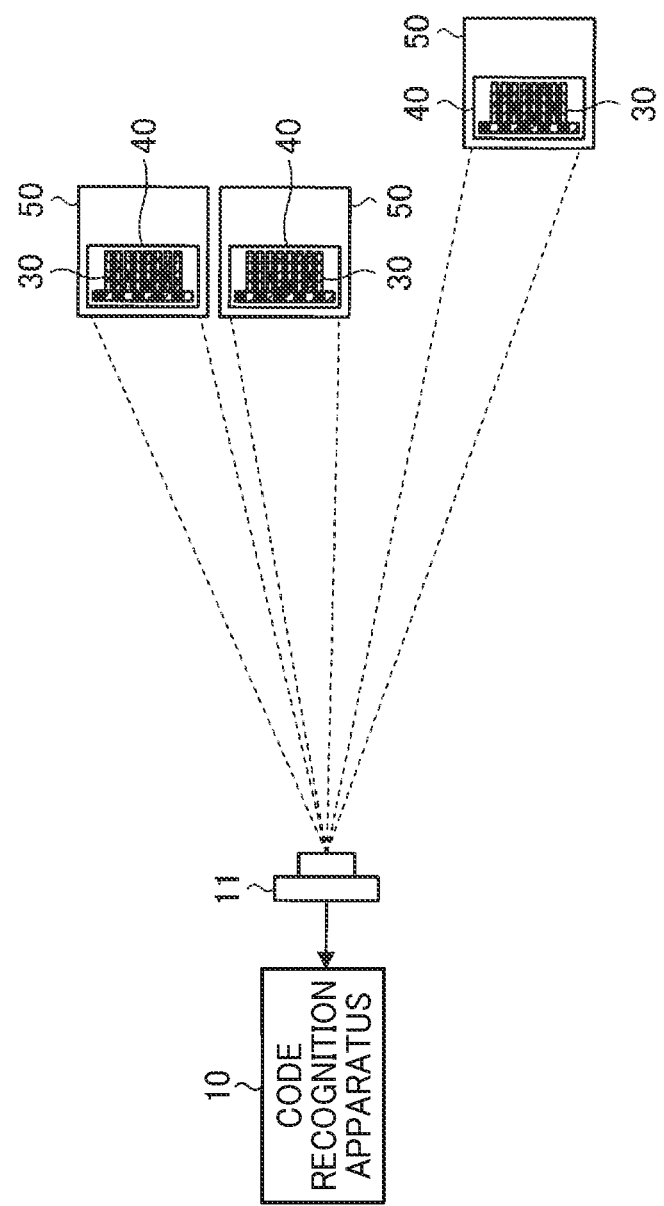
FIG. 1 schematically illustrates an example of an application field of an optically-readable symbol of a first embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

A description is given of a recognition apparatus, a recognition method, a recognition program, a management system, and a conveyance system according to one or more embodiments with reference to the drawings.

First Embodiment

FIG. 1 schematically illustrates an example of an application field of an optically-readable symbol of a first embodiment, in which a code recognition apparatus 10 and an image capture device 11 such as a camera are disposed to process the optically-readable symbol. As described in FIG. 1, a base medium 40 formed with the optically-readable symbol 30 of the first embodiment is attached on each one of articles 50. The base medium 40 is, for example, a print medium printed with the optically-readable symbol 30, but not limited thereto. For example, the base medium 40 can be a display such as a liquid crystal display (LCD) that can display the optically-readable symbol 30. In this description, the optically-readable symbol may be also referred to as the optically-readable symbol for the simplicity of expression.

To be described later, the optically-readable symbol 30 is configured with a plurality of small segments referred to as cells. The plurality of cells are arranged by setting different colors for adjacent cells. The optically-readable symbol 30 expresses information by using a color transition of adjacent cells. In this description, the optically-readable symbol 30 is used as a code information encoded by using color information, which can be also referred to as a two-dimensional color code.

The code recognition apparatus 10 recognizes the optically-readable symbol 30 from an image captured by the image capture device 11, and then decodes the recognized optically-readable symbol 30. More specifically, the code recognition apparatus 10 recognizes the optically-readable symbol 30 to detect a color transition of the adjacent cells included in the optically-readable symbol 30, and performs the decoding process based on the detected color transition. The code recognition apparatus 10 outputs information obtained by decoding the optically-readable symbol 30.

(Optically-Readable Symbol of First Embodiment)

Figure 2:
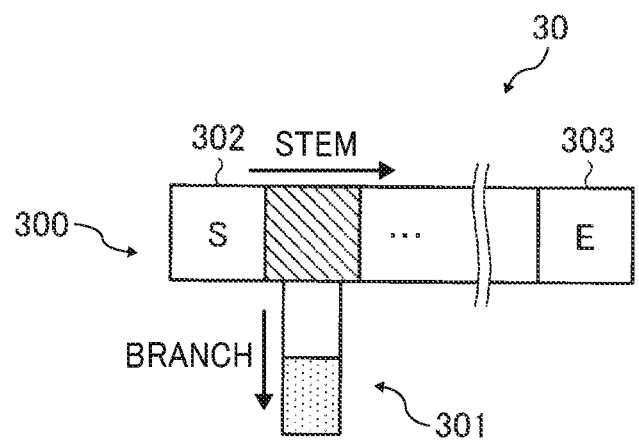
FIG. 2 illustrates an example of a configuration of an optically-readable symbol of the first embodiment.

FIG. 2 illustrates an example of a configuration of the optically-readable symbol 30 of the first embodiment. As described in FIG. 2, the optically-readable symbol 30 includes, for example, a stem, and a branch having one end connected to the stem.

The stem is composed, for example, of a plurality of cells arranged in one dimensionally, in which each of the cells are arranged adjacently with each other with a given sequence. Therefore, the stem includes the plurality of cells arranged in a direction (first direction) without branching and crossing the plurality of cells. The stem is also referred to as a cell row (first arrangement) in this description.

The branch is composed of, for example, one or more of cells, and one end cell composing the branch is connected to one of the plurality of cells of the stem. When one branch has a plurality of cells, the plurality of cells of the one branch is arranged in one dimensionally in a direction (second direction) different from an arrangement direction of the plurality of cells of the stem (first direction). Each of the cells of the one branch are arranged adjacently with each other with a given sequence. The branch is also referred to as a cell column (second arrangement) in this description. When the one branch has a plurality of cells, the plurality of cells of the one branch is arranged in one direction without branching and crossing the plurality of cells same as the stem having the plurality of cells. Further, each of the branches do not contact with each other. In this description, each of the cell row (first arrangement) and the cell column (second arrangement) may be referred to as a cell line.

Each of the cells configuring the stem and the branch is assigned with one color. When color is assigned to each of the plurality of cells, one color is assigned to one cell and another color is assigned to another cell adjacent to the one cell so that different colors are assigned for the adjacent cells, which means the same color is not assigned to the adjacent cells. The colors assigned to each of the plurality of cells can be selected from a plurality of colors, which may be pre-set colors. When the color is assigned to each of the plurality of cells, at least two colors are selected from the pre-set plurality of colors to assign the selected two colors to the adjacent cells, in which the two colors that can be distinguished clearly with each other are preferably selected.

The optically-readable symbol 30 expresses information based a color transition of adjacent cells, which means that the optically-readable symbol 30 includes information encoded by using the color transition between the adjacent cells. The optically-readable symbol 30 can express specific information by encoding information of each of the cells of the stem and each of the cells of the branch, in which various information can be encoded by changing colors assigned to each of the cells of the stem and each of the cells of the branch. In this description, information encoded by each of the cells of the stem is referred to as a main code (first code) and the main code expresses first information, and information encoded by each of the cells of the branch is referred to as a sub-code (second code) and the sub-code expresses second information. Hereinafter, the stem and the branch of the optically-readable symbol 30 are respectively referred to as a main code 300 and a sub-code 301. The sub-code 301 includes one or more branches.

As described in FIG. 2, the main code 300 has a start cell 302 at one end of the main code 300 (see "S" in FIG. 2), and an end cell 303 at another end of the main code 300 (see "E" in FIG. 2). In this example of FIG. 2, it is assumed that a color transition of the adjacent cells in the main code 300 is detected from the start cell 302 toward the end cell 303 as indicated by one arrow in FIG. 2, and a color transition of the adjacent cells in the sub-code 301 is detected from one end of the sub-code 301 connected to the main code 300 toward another end of the sub-code 301 not connected with the main code 300 as indicated by another arrow in FIG. 2.

Further, the start cell 302 and the end cell 303 can be omitted, in which the front end cell and the rear end cell of the main code 300 can be respectively used as the start cell 302 and the end cell 303.

In this description, information encoded as the optically-readable symbol 30 expresses a data string. The data string is, for example, a string of numbers defined by numbers of 0 to 9, but not limited thereto. For example, the optically-readable symbol 30 can be generated by encoding an alphabet data string using small letters "a" to "z," by encoding an alphabet data string using small letters "a" to "z" and larger letters "A" to "Z", and by encoding a data string by using signs, but not limited thereto.

Figure 3:
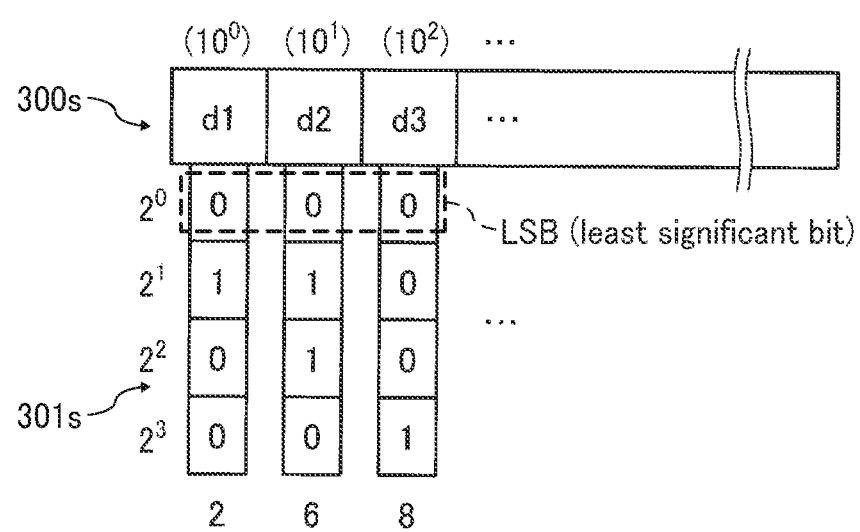
FIG. 3 illustrates an example of information to be encoded as an optically-readable symbol of the first embodiment.

FIG. 3 illustrates an example of information to be encoded as the optically-readable symbol 30. The to-be-encoded data may be referred to original information or original data. In an example case of FIG. 3, a preliminary main code 300s and a preliminary sub-code 301s respectively are encoded as the main code 300 and the sub-code 301 to generate the optically-readable symbol 30 composed of the main code 300 and the sub-code 301. In an example case of FIG. 3, each segment included in the preliminary main code 300s and the preliminary sub-code 301s is referred to as a cell similar to each of the cells of the optically-readable symbol 30.

FIG. 3 illustrates an example case that a to-be-encoded data string is a number. Each of the cells "d1," "d2," "d3" in the cell row of the preliminary main code 300s expresses each of digits of the number. In an example case of FIG. 3, the left end cell "d1" expresses the first digit of the number. The cell "d1" is set as a start cell, and then the cells "d2," "d3," . . . are sequentially set as an adjacent cell, in which each of the cells "d2," "d3," . . . expresses one of digits of the number. Therefore, each of the cells "d1," "d2," "d3" in the cell row of the preliminary main code 300s corresponds to a digit position in the number.

In an example case of FIG. 3, it is assumed that each of the cells "d1," "d2," "d3" in the cell row of the preliminary main code 300s expresses each of digits of a decimal number. Specifically, the left end cell "d1", which is the front end cell, expresses the one's digit ($10^0$ digit), and each of the cells "d2," "d3" . . . sequentially expresses the ten's digit ($10^1$ digit), and the hundred's digit ($10^2$ digit).

In an example case of FIG. 3, each of the cell columns of the preliminary sub-code 301s has one end cell connected to the cells "d1," "d2," "d3" of the preliminary main code 300s, and a value of each of the cell columns of the preliminary sub-code 301s is expressed by a binary number. In an example case of FIG. 3, in each of the cell columns of the preliminary sub-code 301s, a cell connected to the preliminary main code 300s is used as the least significant bit (LSB). In an example case of FIG. 3, each of the cell columns respectively connected to the cells "d1", "d2" and "d3" of the preliminary main code 300s is respectively set with a binary number of "0010", "0110," and "1000." Therefore, in an example case of FIG. 3, a cell column corresponding to the one's digit ($10^0$ digit) expresses a decimal number of "2," a cell column corresponding to the ten's digit ($10^1$ digit) expresses a decimal number of "6," and a cell column corresponding to the hundred's digit ($10^2$ digit) expresses a decimal number of "8" to configure the optically-readable symbol 30.

As to the above described first embodiment, information expressed by the preliminary main code 300s and information expressed by the preliminary sub-code 301s are encoded by using the color transition between the adjacent cells. In this configuration, information to be expressed can be pre-set in the preliminary main code 300s, and then the preliminary main code 300s is encoded to the main code 300 of the optically-readable symbol 30. Therefore, when different colors are set for the adjacent cells in the main code 300, the main code 300 can be decoded based on the color transition of the adjacent cells among the adjacent cells in the main code 300. For example, if the number of cells included in the main code 300 is known, the cells in the main code 300 can be decoded to information of the number of digits (e.g., $10^0$, $10^1$, $10^2$) of one number by counting the number of times of the color transition between the adjacent cells of the main code 300.

The preliminary sub-code 301s expresses various values corresponding to various to-be-encoded information. Therefore, the preliminary sub-code 301s is encoded by using a conversion table that correlates the color transition and values expressed by the color transition, in which the conversion table can be prepared in advance.

A description is given of an encoding procedure for setting a binary number for the first embodiment with reference to FIG. 4. To express the number as a binary number based on the color transition between adjacent cells set with different colors, at least three colors are required. FIG. 4 illustrates an example of an encoding procedure for setting a binary number by using three colors such as red (R), green (G), and blue (B). For example, when the color transition is performed in the clockwise direction as disclosed in FIG. 4A, the color transits from red (R) to blue (B), blue (B) to green (G), and green (G) to red (R), in which the color transition is expressed with a value of "0." Further, when the color transition is performed in the counter-clockwise direction as disclosed in FIG. 4A, the color transits from red (R) to green (G), green (G) to blue (B), and blue (B) to red (R), in which the color transition is expressed with a value of "1."

For example, FIG. 4B illustrates an example of a cell line composed of a plurality of cells, in which the color transits from green (G), blue (B), green (G), to red (R) between adjacent cells of the plurality of cells. When the color transits from the left to the right in FIG. 4B between adjacent cells of the plurality of cells, the color transition from green (G) to blue (B) is expressed with a value of "1," the color transition from blue (B) to green (G) is expressed with a value of "0", and the color transition from green (G) to red (R) is expressed with a value of "0." Therefore, the color arrangement of FIG. 4B expresses a binary number of "001" that is a value of "1" of a decimal number.

FIG. 4C illustrates another example of cell line composed of a plurality of cells, in which the color transits from red (R), green (G), blue (B) to green (G) between adjacent cells of the plurality of cells. The color arrangement of each of the cells of FIG. 4B and the color arrangement of each of the cells of FIG. 4C are opposite directions. When the color transits from the right to the left in FIG. 4C between adjacent cells of the plurality of cells, the color transition from red (R) to green (G) is expressed with a value of "1," the color transition from green (G) to blue (B) is expressed with a value of "1," and the color transition from blue (B) to green (G) is expressed with a value of "0". Therefore, the color arrangement of FIG. 4C expresses a binary number of "011" that that is a value of "3" of a decimal number.

FIG. 4D illustrates an example of a conversion table that correlates the color transition and values set for the encoding procedure of FIG. 4A. In the conversion table of FIG. 4D, the left end column indicates a color of a most-recent cell used as a transition origin cell, and the upper row of the conversion table indicates a value to be expressed by the color transition from the transition origin cell to a cell adjacent to the transition origin cell. In this description, the color transition occurs from one cell to another cell adjacent to the one cell, in which the one cell is referred to as the transition origin cell because the color transition occurs from the transition origin cell to the adjacent cell. For example, when the color of the cell used as the transition origin is red (R) and a value of "1" is to be expressed, the color of the cell used as the transition destination, adjacent to the cell used as the transition origin, is set green (G). Similarly, when the color of the cell used as the transition origin is blue (B) and a value of "1" is to be expressed, the color of the cell used as the transition destination, adjacent to the cell used as the transition origin, is set red (R).

Figure 5A:
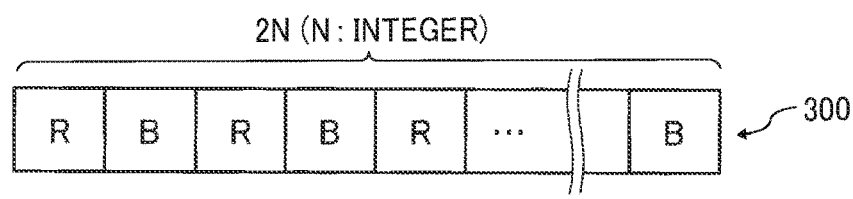
FIGS. 5A and 5B illustrates an example of a color arrangement in a main code and a sub-code, which are encoded codes.

FIG. 5 illustrates an example of a color arrangement in the main code 300 and the sub-code 301, which are the encoded codes. FIG. 5A illustrates an example of a color arrangement of each of the cells in the cell row of the main code 300. In an example case of FIG. 5A, the cell row of the main code 300 is composed of a plurality of first cells assigned with a first color such as red (R), and a plurality of second cells assigned with a second color such as blue (B), which are arranged alternatively as illustrated in FIG. 5A. Further, the cell row of the main code 300 is composed of cells having the number of 2N (N: is an integer of one or more). With this configuration, by setting the color of the front end cell of the cell row of the main code 300 with the first color, the color of the rear end cell of the cell row of the main code 300 is automatically set with the second color, with which the front end and the rear end of the cell row of the main code 300 can be recognized easily.

Figure 5B:
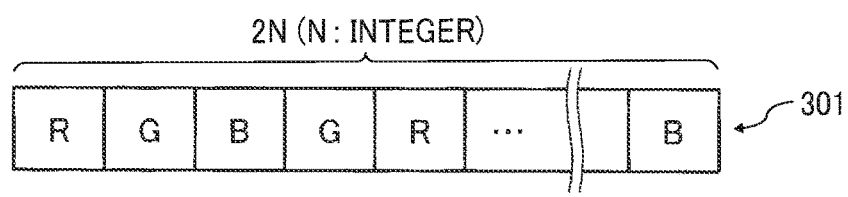

FIG. 5B illustrates an example of the color arrangement of each of the cells in the cell column of the sub-code 301. The cell column of the sub-code 301 is composed of a plurality of cells by assigning different colors to adjacent cells in the plurality cells. Specifically, three colors are assigned to the plurality cells by assigning different colors to the adjacent cells such that the binary number can be expressed. Further, as to the cell column of the sub-code 301, the cell of the main code 300 connected to the cell column of the sub-code 301 is used as the first transition origin cell for the cell column of the sub-code 301, and the sub-code 301 is encoded by using the above described encoding procedure.

When some values are expressed by the cell column of the sub-code 301, any one of the three colors may not be assigned to the cells in the cell column of the sub-code 301. By contrast, since two colors, selected from the three colors used for expressing the binary number in the sub-code 301, are assigned to the cells in the cell row of the main code 300, both of the two colors are surely assigned to the cells in the cell row of the main code 300, and the cells having one color and the cells having another color are arranged alternatively in the cell row of the main code 300. Therefore, as to the cell row of the main code 300, the colors selected for the main code 300 are surely assigned to the cells in the cell row of the main code 300. Therefore, for example, when the optically-readable symbol 30 is extracted from an optically captured image including an image of the optically-readable symbol 30, the optically-readable symbol 30 can be extracted easily by detecting the color information assigned to each of the cells of the main code 300.

Figure 6:
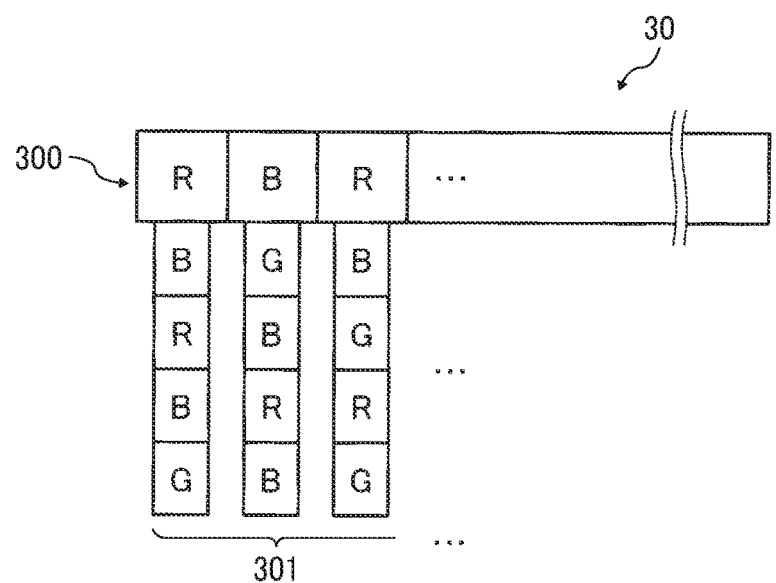
FIG. 6 illustrates an example of an optically-readable symbol, which is generated by encoding information of FIG. 3 by applying the encoding procedure of FIG. 4A.

FIG. 6 illustrates an example of the optically-readable symbol 30, which is generated by encoding the information of FIG. 3 by applying the encoding procedure described with reference to FIG. 4. In this example case, the cell row of the main code 300 is composed of even-number cells, in which the front end cell is assigned with red (R), and then blue (B) and red (R) cells are arranged alternatively.

Further, the sub-code 301 includes, for example, a plurality of cell columns. As to the left-end cell column of the sub-code 301 in FIG. 6, one end cell of the left-end cell column is connected to the front end cell of the main code 300 assigned with red (R), in which red (R) is set as a color of the first transition origin cell for the left-end cell column of the sub-code 301, and each of the cells in the left-end cell column of the sub-code 301 is assigned with one color by setting different color for the adjacent cells. In this example case, each of the cells in the left-end cell column is respectively assigned with blue (B), red (R), blue (B), green (G) based on the values of "0, 1, 0, 0" (see FIG. 2) and by applying the conversion table of FIG. 4D.

As described in FIG. 6, the optically-readable symbol 30 includes the stem, which is the cell row of the main code 300 extending in one direction, and a plurality of the branches, which are the cell columns of the sub-code 301 extending in another direction, and each of the cell columns of the sub-code 301 is respectively connected to each one of the cells in the cell row of the main code 300. Further, to recognize the optically-readable symbol 30 with an enhanced precision from an image of the optically-readable symbol 30 captured by the image capture device 11, each of the cell columns of the sub-code 301 is disposed by setting an interval between adjacent cell columns. Therefore, the optically-readable symbol 30 includes the stem and the plurality of the branches, for example, with a shape of comb.

By configuring the optically-readable symbol 30 with the comb shape, the shape of the optically-readable symbol 30 and other shape included in the optically captured image can be distinguished easily in the optically captured image including an image of the optically-readable symbol, and thereby a direction and/or angle of the optically-readable symbol 30 in the optically captured image can be recognized easily. With this configuration, for example, the to-be-described later extraction process of the optically-readable symbol 30 using a template can be performed with a higher precision.

In the above description, the number of colors assigned to the plurality of cells configuring the optically-readable symbol 30 is three colors, and the information is expressed by the binary numbers, but not limited thereto. For example, the number of colors assigned to the plurality of cells can be four or more colors. The greater the number of colors assigned to the plurality of cells, the greater information can be expressed with the same number of cells.

FIG. 7 illustrates an example of an encoding procedure when four colors of red (R), green (G), blue (B), and black (K) are used for the first embodiment. When four colors are used, the numbers can be expressed by a ternary number. For example, when the color transition is performed in the clockwise direction in an example case disclosed in FIG. 7A, the color transits from red (R) to black (K), black (K) to blue (B), blue (B) to green (G), and green (G) to red (R), in which a value of the color transition is expressed as "0." Further, when the color transition is performed in the counter-clockwise direction in an example case disclosed in FIG. 7A, the color transits from red (R) to green (G), green (G) to blue (B), blue (B) to black (K), and black (K) to red (R), in which a value of the color transition is expressed as "1." Further, when the color transition is performed in the diagonal line direction in an example case disclosed in FIG. 7A, which means when the color transits from red (R) to blue (B) or from blue (B) to red (R), and the color transits from black (K) to green (G) or from green (G) black (K), a value of the color transition is expressed as "2."

For example, FIG. 7B illustrates an example of a cell line composed of a plurality of cells, in which the color transits sequentially from green (G), red (R), blue (B), black (K), to green (G) between adjacent cells of the plurality of cells. When the color transits from the left to the right in FIG. 7B between adjacent cells of the plurality of cells, the color transition from green (G) to red (R) is expressed with a value of "0," the color transition from red (R) to blue (B) is expressed with a value of "2," the color transition from blue (B) to black (K) is expressed with a value of "1," and the color transition from black (K) to green (G) is expressed with a value of "2." Therefore, the color arrangement of FIG. 7B expresses a ternary number of "2120" that is a value of "69" of a decimal number.

Further, for example, FIG. 7C illustrates an example of cell line composed of a plurality of cells, in which the color transits sequentially from green (G), black (K), blue (B), red (R) to green (G) between adjacent cells of the plurality of cells. The color arrangement of each of the cells of FIG. 7B and the color arrangement of each of the cells of FIG. 7C are opposite directions. When the color transits from the right to the left in FIG. 7C between adjacent cells of the plurality of cells, the color transition from green (G) to black (K) is expressed with a value of "2," the color transition from black (K) to blue (B) is expressed with a value of "0," the color transition from blue (B) to red (R) is expressed with a value of "2," and the color transition from red (R) to green (G) is expressed with a value of "1." Therefore, the color arrangement of FIG. 7C expresses a ternary number of "1202" that is a value of "47" of a decimal number.

The encoding procedure using four colors for the color transition is not limited to an example case of FIG. 7A. For example, FIG. 7D illustrates another example case of the encoding procedure when four colors of red (R), green (G), blue (B), and black (K) are used for the first embodiment. In this another example case of FIG. 7D, when the color transits between red (R) and black (K), a value of the color transition is expressed as "0," when the color transits between red (R) and green (G), a value of the color transition is expressed as "1," and when the color transits between green (G) and blue (B), a value of the color transition is expressed as "2." Further, when the color transits from blue (B) to red (R), and from black (K) to green (G), a value of the color transition is expressed as "1." Further, when the color transits from green (G) to black (K), a value of the color transition is expressed as "0," and when the color transits from red (R) to blue (B), a value of the color transition is expressed as "2." Further, when the color transits from blue (B) to black (K), a value of the color transition is expressed as "0," and when the color transits from black (K) to blue (B), a value of the color transition is expressed as "2."

FIG. 7E illustrates an example of a conversion table that correlates the color transition and values set for the encoding procedure of FIG. 7D. The column and the row of the conversion table in FIG. 7E indicate same information as the conversion table of FIG. 4D. As described in FIG. 7E, for example, when the color of the cell used as the transition origin is assigned with red (R) and a value of "2" is to be expressed, the color of the cell used as the transition destination, adjacent to the cell used as the transition origin, is set blue (B). Similarly, when the color of the cell used as the transition origin is assigned with black (K) and a value of "1" is to be expressed, the color of the cell used as the transition destination, adjacent to the cell used as the transition origin, is set green (G).

Figure 8:
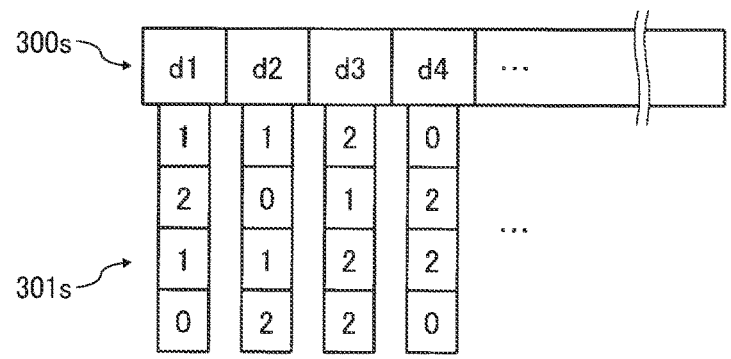
FIG. 8 illustrates an example of information to be encoded as an optically-readable symbol of the first embodiment when the number of colors assigned to each of the plurality of cells is four colors.
Figure 9:
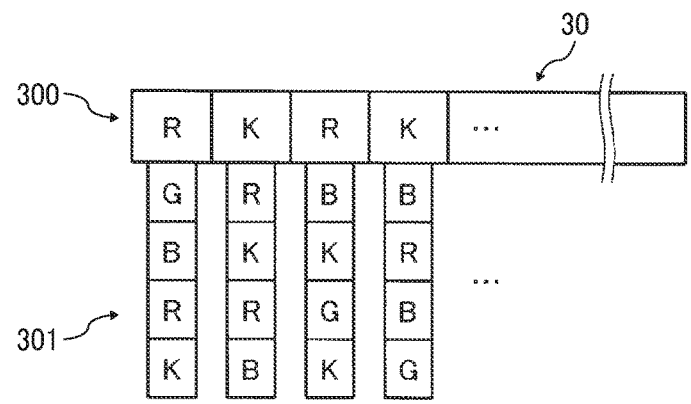
FIG. 9 illustrates an example of an optically-readable symbol generated by encoding information of FIG. 8 by applying the encoding procedure of FIG. 7A when the number of colors assigned to each of the plurality of cells is four colors.

A description is given of one specific example when the number of colors assigned to the plurality of cells of the optically-readable symbol 30 is set with four colors with reference to FIGS. 8 and 9. As described in FIG. 8, for example, each of the cell rows of the preliminary sub-code 301s, respectively connected to each of the cells "d1," "d2," "d3," and "d4" of the preliminary main code 300s, has ternary numbers of "0121," "2101," "2212" and "0220."

FIG. 9 illustrates an example of the optically-readable symbol 30 that is generated by encoding information of FIG. 8 by applying the encoding procedure described with reference to FIG. 7. In this example case, the cell row of the main code 300 is composed of even-number cells, and the front end cell is assigned with red (R), and then black (K) and red (R) cells are arranged alternatively.

Further, similar to an example case of FIG. 6, the sub-code 301 includes, for example, a plurality of cell columns in an example case of FIG. 9. As to the left end cell column of the sub-code 301, one end cell of the left-end cell column is connected to the front end cell of the main code 300 assigned with red (R), in which red (R) is set as a color of the first transition origin cell for the left-end cell column of the sub-code 301, and each of the cells of the left-end cell column of the sub-code 301 is assigned with one color by setting different color for the adjacent cells. In this example case of FIG. 9, each of the cells in the left end cell column of the sub-code 301 is respectively assigned with green (G), blue (B), red (R), black (K) based on the values of "1, 2, 1, 0" (see FIG. 8) and applying the conversion table of FIG. 7D.

(Configuration of Code Generation System of First Embodiment)

Figure 10:
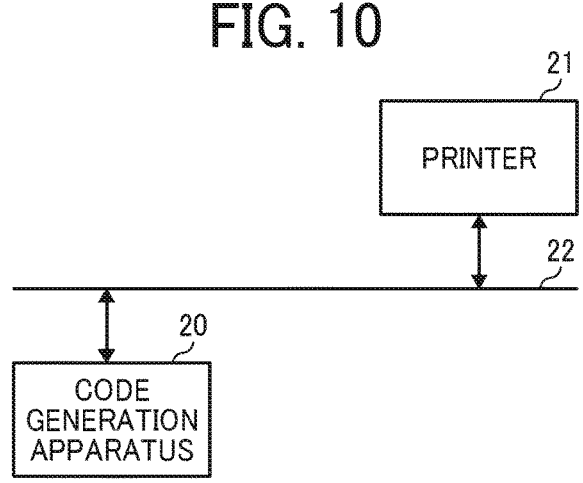
FIG. 10 illustrates an example of a configuration of a code generation system of the first embodiment.

A description is given of a configuration for generating the optically-readable symbol 30 of the first embodiment. FIG. 10 illustrates an example of a configuration of a code generation system applicable to the first embodiment. As described in FIG. 10, the code generation system includes, for example, a code generation apparatus 20, and a printer 21 connected to the code generation apparatus 20 via, for example, the network 22. The code generation apparatus 20 and the printer 21 can be connected with each other wirelessly or by wire.

When information is input to the code generation apparatus 20, the code generation apparatus 20 encodes the input information by applying the above described encoding procedure to generate the optically-readable symbol 30. The printer 21 prints the optically-readable symbol 30 generated by the code generation apparatus 20 on a print medium such as the base medium 40, with which the base medium 40 displaying the optically-readable symbol 30 is prepared. Then, the base medium 40 is attached on, for example, each one of the articles 50 as illustrated in FIG. 1.

Figure 11:
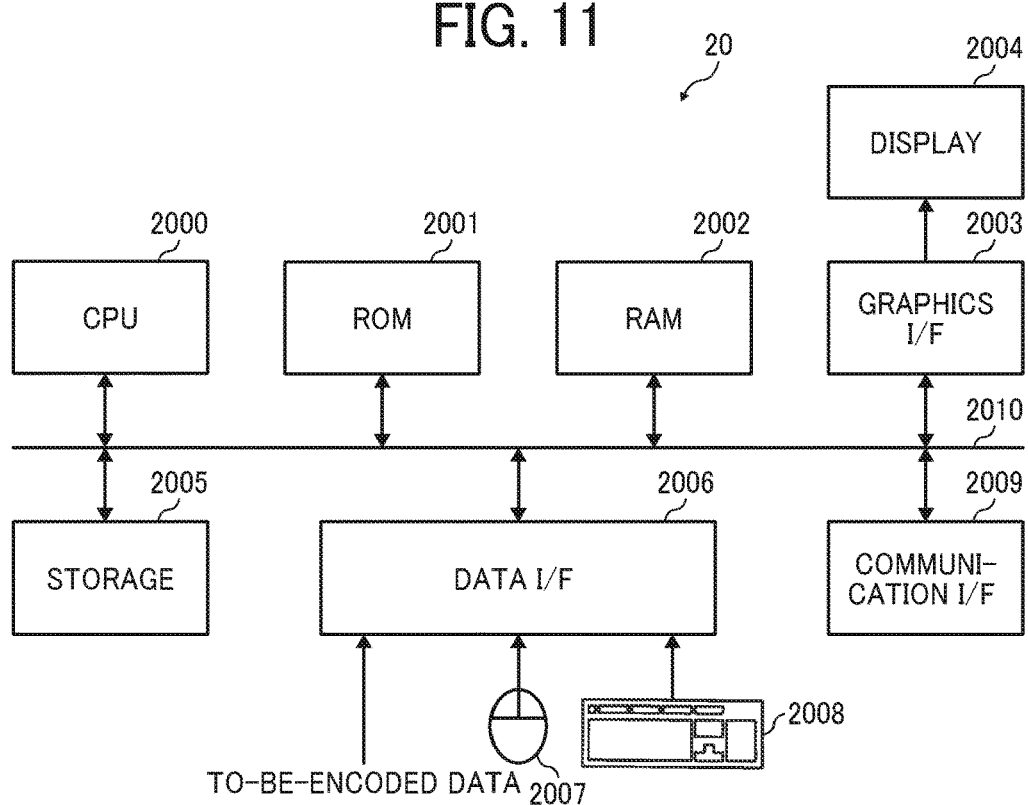
FIG. 11 illustrates an example of a hardware block diagram of a code generation apparatus of the first embodiment.

FIG. 11 illustrates an example of a hardware block diagram of the code generation apparatus 20 of the first embodiment. As described in FIG. 11, the code generation apparatus 20 includes, for example, a central processing unit (CPU) 2000, a read only memory (ROM) 2001, a random access memory (RAM) 2002, a graphics interface (I/F) 2003, a storage 2005, a data interface (I/F) 2006, and a communication interface (I/F) 2009, which are communicably connected with each other via a bus 2010. The code generation apparatus 20 can be devised by using a general computer.

The storage 2005 is a non-volatile memory such as a hard disk drive and a flash memory that stores programs such as a plurality of instructions, and data. The CPU 2000 controls the code generation apparatus 20 entirely by executing programs stored in the storage 2005 and/or the ROM 2001 by using the RAM 2002 as a working memory.

The graphics I/F 2003 is connected to a display 2004. The graphics I/F 2003 generates a display signal to be displayed on the display 2004 based on display control information generated by the CPU 2000 when the CPU 2000 executes programs. The data I/F 2006 is an interface used for receiving data from an external device of the code generation apparatus 20. Further, the data I/F 2006 can be connected to a pointing device 2007 such as a mouse, and a key board 2008. The data I/F 2006 employs, for example, universal serial bus (USB).

To-be-encoded data can be supplied to the code generation apparatus 20 from the external device via the data I/F 2006, but not limited thereto. For example, a user can input the to-be-encoded data to the code generation apparatus 20 by operating the pointing device 2007 and/or the key board 2008. In this description, the to-be-encoded data may be referred to original information or data.

The communication I/F 2009 is connected to the network 22, and performs communication via the network 22. The network 22 can be, for example, a local area network (LAN) or the Internet. Further, the network 22 can be connected to the communication I/F 2009 wirelessly or by wire to perform communication.

Figure 12:
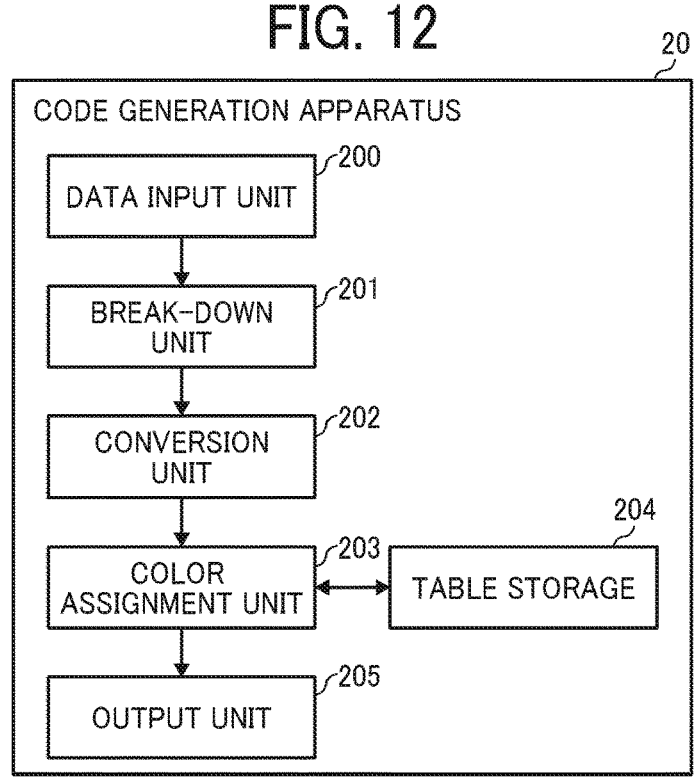
FIG. 12 illustrates an example of a functional block diagram of the code generation apparatus of the first embodiment.

FIG. 12 illustrates an example of a functional block diagram of the code generation apparatus 20 of the first embodiment. As described in FIG. 12, the code generation apparatus 20 includes, for example, a data input unit 200, a break-down unit 201, a conversion unit 202, a color assignment unit 203, a table storage 204, and an output unit 205.

The data input unit 200, the break-down unit 201, the conversion unit 202, the color assignment unit 203 and the output unit 205 can be devised using one or more programs executed by the CPU 2000, but not limited thereto. For example, a part or the entire of the data input unit 200, the break-down unit 201, the conversion unit 202, the color assignment unit 203 and the output unit 205 can be configured as one or more hardware circuits that can collaborate with each other. Further, the table storage 204 can be devised by using a part of a memory area in the storage 2005 or the RAM 2002.

The data input unit 200 receives the to-be-encoded data, which is input to the code generation apparatus 20 via the data I/F 2006. In this example case, the to-be-encoded data is, for example, the data string as above described. The break-down unit 201 decomposes or breaks down the data string received by the data input unit 200 into a value of each digit.

The conversion unit 202 converts the value of each digit, decomposed or broken down by the break-down unit 201, into a value expressed by using a plurality of colors assignable to the plurality of cells in the optically-readable symbol 30. For example, when four colors are assigned to the plurality of cells, the conversion unit 202 converts the value of each digit into a ternary number.

The table storage 204 stores the conversion table such as the conversion tables of FIGS. 4D and 7D that are prepared in view of the number of colors assigned to the plurality of cells in advance. The color assignment unit 203 assigns color to each of the cells in the optically-readable symbol 30 based on the value converted by the conversion unit 202, and the transition origin color by applying the conversion table stored in the table storage 204. Further, it is assumed that the color assignment unit 203 stores information indicating the color arrangement of each of the cells in the cell row of the main code 300 in advance.

The output unit 205 stores information of each of the cells assigned with one color by the color assignment unit 203, and information of color assigned to each of the cells. When the output unit 205 determines that all of the cells in the optically-readable symbol 30 are assigned with colors, the output unit 205 correlates information indicating the color assigned to each of the cells in the optically-readable symbol 30 and information indicating each of the cells, and outputs the correlated information.

Further, when encoding one cell column of the sub-code 301, the color assignment unit 203 can acquire color of the cell that is encoded most recently from the output unit 205.

The code generation program to implement each of capabilities of the code generation apparatus 20 of the first embodiment can be stored in a computer readable storage medium such as compact disk (CD), flexible disk (FD), and digital versatile disk (DVD) as an installable format and executable format file, but not limited thereto. For example, the code generation program can be stored on a computer or a storage on a network such as the Internet, and downloaded via the network as required. Further, the code generation program can be provided or distributed via the network such as the Internet.

The code generation program can be used to implement one or more modules including the above described data input unit 200, break-down unit 201, conversion unit 202, color assignment unit 203 and output unit 205. In an actual hardware configuration, when the CPU 2000 reads out the code generation program from a memory such as the storage 2005, and executes the code generation program, the above described data input unit 200, break-down unit 201, conversion unit 202, color assignment unit 203 and output unit 205 are loaded on a main memory such as the RAM 2002 to devise the data input unit 200, the break-down unit 201, the conversion unit 202, the color assignment unit 203, and the output unit 205 on the main memory.

Figure 13:
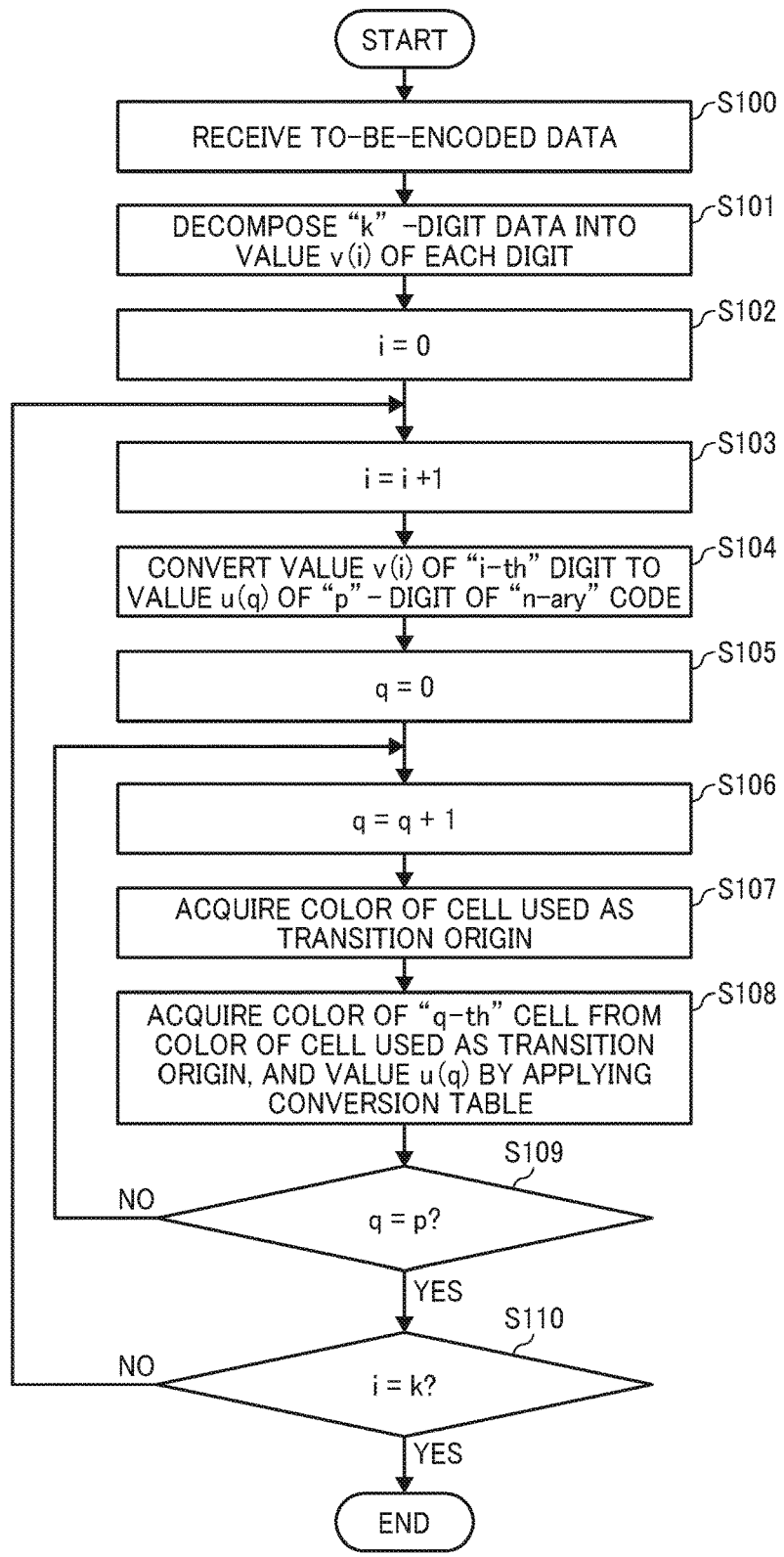
FIG. 13 is an example of a flow chart illustrating steps of a process of generating an optically-readable symbol of the first embodiment.

FIG. 13 is an example of a flow chart illustrating steps of a process of generating the optically-readable symbol 30 of the first embodiment. At step S100, the data input unit 200 receives the to-be-encoded data. In this example case, it is assumed that the to-be-encoded data received by the data input unit 200 is, for example, a data string of "k"-digits. At step S101, the break-down unit 201 decomposes or breaks down the "k"-digit data string received by the data input unit 200 into a value v(i) of each digit indicated by "i". In this process, a variable "i" is a loop variable indicating a digit position in the data string, wherein the variable "i" is an integer of "0≤i≤k".

At step S102, the variable "i" is initialized to zero (0), and at step S103, the variable "i" is added with one (1).

At step S104, the conversion unit 202 converts the value v(i) of "i"-digit in the "k"-digit data string, decomposed or broken down by the break-down unit 201, to a value u(q) of a "n"-ary number having "p"-digits, wherein "n" is a pre-set integer of two or more, which means the "n"-ary number includes binary number, ternary number and so on. Further, the variable "q" is a loop variable indicating a position of a cell in the cell column of the sub-code 301, wherein the variable "q" is an integer of "0≤q≤p, and a value "p" indicates the total number of cells included in the cell column in the sub-code 301.

At step S105, the variable "q" is initialized to zero (0), and at step S106, the variable "q" is added with one (1).

At step S107, the color assignment unit 203 acquires color information of a most-recent cell (i.e., transition origin), which is the cell positioned right before a cell to be currently assigned with a color, from the output unit 205. Further, at step S107, when the variable "q" is one (1), the color assignment unit 203 acquires a color of a cell corresponding to "i-th" digit in the cell row of the main code 300.

At step S108, the color assignment unit 203 acquires a color of "q-th" cell in the cell column of the sub-code 301, corresponding to the "i-th" digit in the cell row of the main code 300, from the color of the cell (i.e., transition origin) acquired at step S107 and the value u(q) acquired at step S104 by applying the conversion table stored in the table storage 204.

At step S109, the color assignment unit 203 determines whether the variable "q" matches the value "p." When the color assignment unit 203 determines that the variable "q" does not match the value "p" (S109: NO), the color assignment unit 203 returns the sequence to step S106. Further, when the color assignment unit 203 determines that the variable "q" matches the value "p" (S109: YES), the color assignment unit 203 proceeds the sequence to step S110.

At step S110, the conversion unit 202 determines whether the variable "i" matches the value "k." When the conversion unit 202 determines that the variable "i" does not match the value "k" (S110: NO), the conversion unit 202 returns the sequence to step S103. Further, when the conversion unit 202 determines that the variable "i" matches the value "k" (S110: YES), the conversion unit 202 determines that the encoding of the data string, received at step S100, to the optically-readable symbol 30 is completed, and ends the sequence of FIG. 13.

Figure 14:
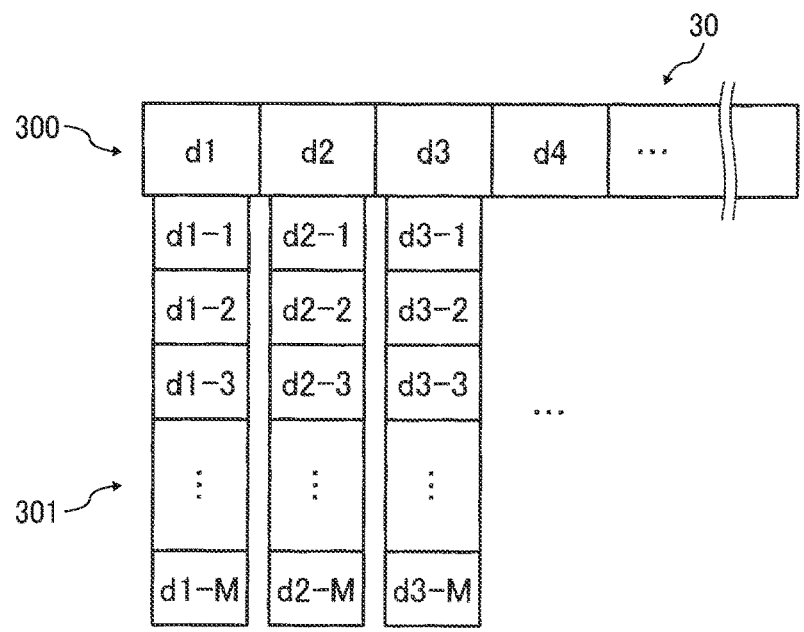
FIG. 14 illustrates an example of an optically-readable symbol of the first embodiment, in which the number of cells included in each of cell columns included in a sub-code is set with the same number.

Further, in the sequence of FIG. 13, the number of cells included in each of the cell columns included in the sub-code 301 is not limited to a specific number. For example, the number of cells included in each of the cell columns of in the sub-code 301 can be set with the same number. FIG. 14 illustrates an example of the optically-readable symbol 30 of the first embodiment, in which the number of cells included in each of the cell columns of in the sub-code 301 is set with the same number such as "M" cells.

When the number of cells included in each of the cell columns included in the sub-code 301 is set with the same number, a decoding process of the optically-readable symbol 30, to be described later, can be performed easily. Further, if a size of each of the cells included in each of the cell columns of the sub-code 301 is also set with the same size, the extraction process of the optically-readable symbol 30 using a template, to be described later, can be performed easily.

Further, as to the first embodiment, information is encoded by using the color transition of adjacent cells. Therefore, the size of each of the cells configuring the optically-readable symbol 30 can be set differently. In this case, when a length of each of the cell columns of the sub-code 301 is set with the same length, the extraction process of the optically-readable symbol 30 using a template, to be described later, can be performed easily.

Figure 15:
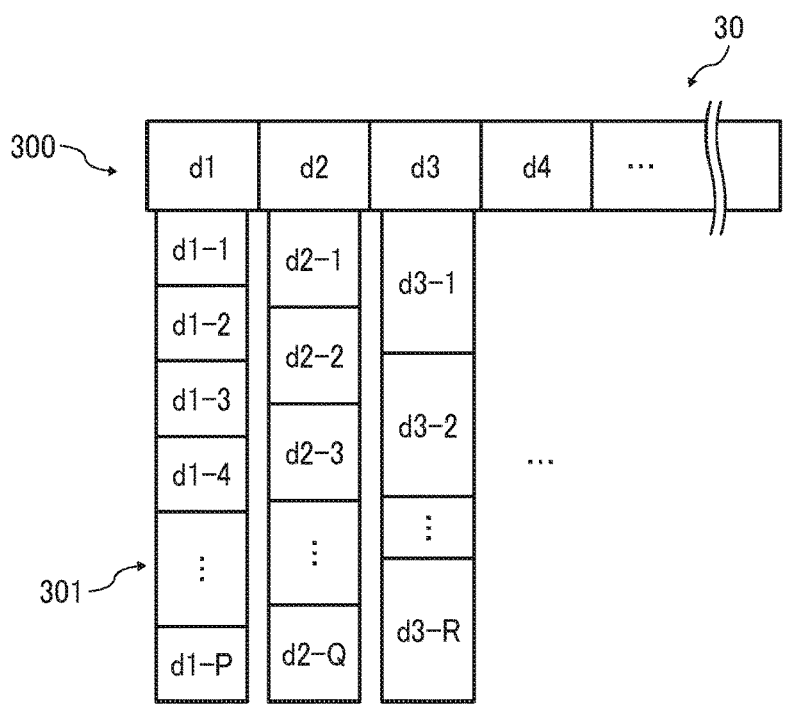
FIG. 15 illustrates another example of an optically-readable symbol of the first embodiment, in which a size of cells included in each of cell columns of a sub-code are set differently for each of the cell columns while a length of each of the cell columns are set with the same length.

FIG. 15 illustrates another example of the optically-readable symbol 30 of the first embodiment, in which the size of cells included in each of the cell columns of the sub-code 301 are set differently for each of the cell columns in the sub-code 301 while the length of each of the cell columns in the sub-code 301 is set with the same length. In an example case of FIG. 15, the left end cell column of the sub-code 301 includes "P" cells, the middle cell column of the sub-code 301 includes "Q" cells, and the right end cell column of the sub-code 301 includes "R" cells, in which P, Q, and R indicate the total number of cells included in each one of the cell columns. In this configuration, the size of cells included in the middle cell column is set greater than the size of cells included in the left end cell column, and the size of cells included in the right end cell column is set greater than the size of cells included in the middle cell column. Therefore, "Q" is set smaller than "P," and further "R" is set smaller than "Q" (i.e., P>Q>R). In this example case, the size of each cell included in each of the cell columns of the sub-code 301 can be determined from the total number of cells (i.e., P, Q, and R) included each of the cell columns.

In the above description, the start cell 302 and the end cell 303 described in FIG. 2 are omitted from the optically-readable symbol 30. If the start cell 302 and the end cell 303 are used, the recognition processing of each of the cells and the decoding process of the optically-readable symbol 30, to be described later, can be performed easily.

Figure 16:
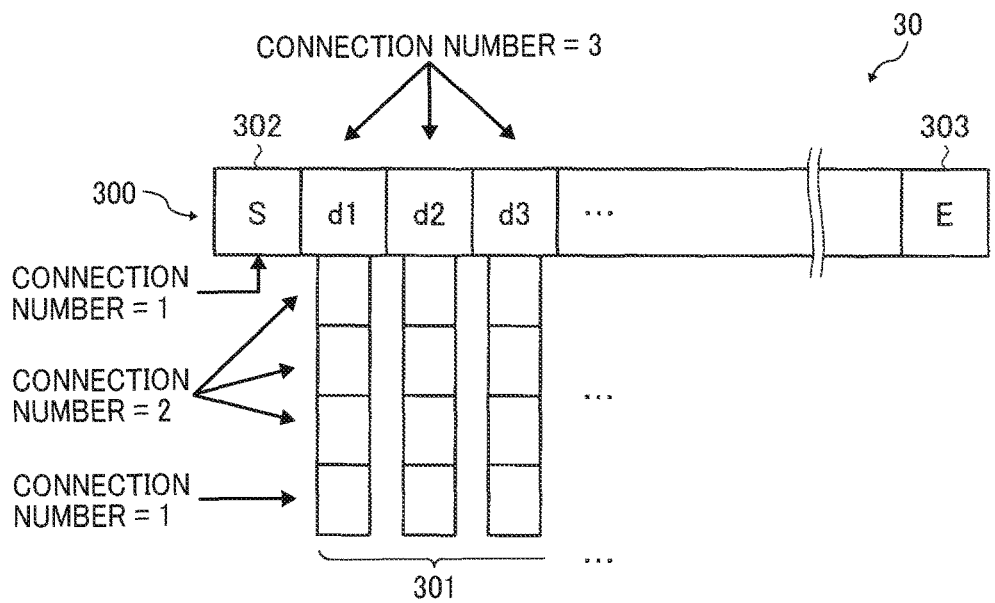
FIG. 16 illustrates an example of an optically-readable symbol of the first embodiment including a start cell and an end cell.

FIG. 16 illustrates an example of the optically-readable symbol 30 including the above described start cell 302 and the end cell 303 for the first embodiment. As described in FIG. 16, as to the cell row of the main code 300, the cell column of the sub-code 301 is not connected to the start cell 302 and the end cell 303. Further, as to the cell row of the main code 300, each of the cells set between the start cell 302 and the end cell 303 is connected to each of the cell columns of the sub-code 301.

In this configuration, each of the cells can be connected to one or more other cells, in which one cell can be connected to one or more other cells, and the number of the one or more other cells connected to the one cell is referred to as a connection number. Based on the connection number indicating the number of other cells connected to each one of the cells, the main code 300 and the sub-code 301 can be recognized. Specifically, the connection number of the start cell 302 and the connection number of the end cell 303 are respectively set one (1). The connection number of an end cell in each of the cell columns of the sub-code 301 (i.e., a cell not connected to a cell of the cell row of the main code 300) is also respectively one (1). The connection number of each of the cells in each of the cell columns of the sub-code 301, not used as the end cell, is set two (2). The connection number of each of the cells between the start cell 302 and the end cell 303 in the cell row of the main code 300 is set three (3). Therefore, a cell having the connection number of one (1) and connected to another cell having the connection number of three (3) can be determined as the start cell 302 or the end cell 303.

By setting the start cell 302 and the end cell 303, the cell row of the main code 300 can be recognized easily without setting the color for the end cell of the cell row of the main code 300 when performing the decoding processing. Further, since the color is not required to set to the end cell of the cell row of the main code 300, information can be embedded in the cell row of the main code 300, with which information amount settable in the optical symbol 30 can be increased.

(Example of Optically-Readable Symbol of First Embodiment)

A description is given of one specific example of the optically-readable symbol 30 of the first embodiment. In this case, the color of cells of the optically-readable symbol 30 is set with four colors such as red (R), green (G), blue (B) and black (K), and each digit of to-be-encoded data (i.e., data string) is expressed by a ternary number.

As to the sub-code 301, information at each digit can be expressed by using a code table correlating numerical values and characters. In addition to numbers, characters and signs can be expressed by using the code table.

The code table is, for example, American Standard Code for Information Interchange (ASCII) code. The ASCII code is expressed by seven-bit values, in which control characters are assigned to codes "0" to "31", "blank" is assigned to code "32", reference signs are assigned to codes "33" to "47," "58" to "64," "91" to "96" and "123" to "126," numbers are assigned to codes "48" to "57," larger letters of alphabet are assigned to codes "65" to "90," small letters of alphabet are assigned to codes "97" to "122," and "delete" is assigned to code "127."

For example, when the number of cells included in each of the cell columns of the sub-code 301 is set four cells, values of "0" to "80" can be expressed by using ternary numbers. Therefore, when values of four-digit ternary numbers are applied to ASCII code, a part of larger letters of alphabet can be expressed. Further, when values of four-digit ternary numbers expressed by each of the cell columns of the sub-code 301 are shifted by setting, for example, an offset value of "32," all of the characters and most of reference signs, excluding a part of reference signs (e.g., blank), expressed by the ASCII code, can be expressed by four-digit ternary numbers.

Further, the correlation of numerical values and characters is not limited to the code table of ASCII code. As to the first embodiment, if characters, signs, and numerical values expressible by the cell column of the sub-code 301 can be correlated with a one-to-one basis, any kind of code tables can be used. Hereinafter, for the simplicity of description, values of four-digit ternary numbers expressed by each of the cell columns of the sub-code 301 are applied to the ASCII code.

Figure 17:
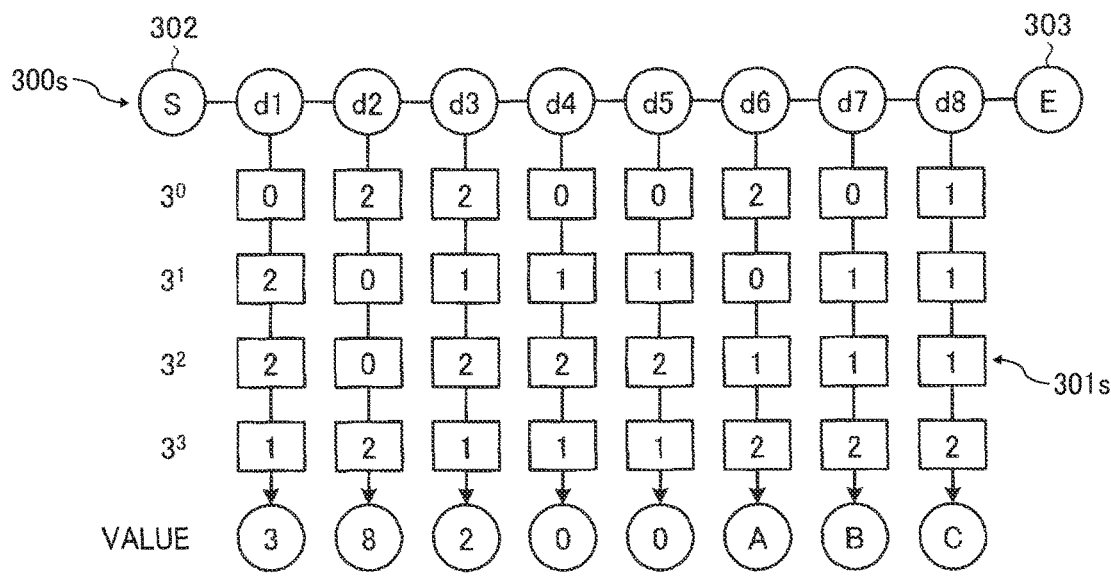
FIG. 17 illustrates an example of data to be encoded as an optically-readable symbol of the first embodiment, in which to-be-encoded data is set with an eight-digit data string

FIG. 17 illustrates an example of data to be encoded as the optically-readable symbol 30 of the first embodiment, in which the to-be-encoded data is an eight-digit data string of "CBA00283." As described in FIG. 17, each digit of the eight-digit data string is indicated as cells "d1," "d2," . . . , "d8" from the smallest digit. At step S100 of FIG. 13, the data input unit 200 receives the data string "CBA00283" input to the code generation apparatus 20. At step S101, the break-down unit 201 decomposes or breaks down the data string "CBA00283" to a value of each digit, in which the break-down unit 201 respectively decomposes or breaks down each digit of the data string "CBA00283" to values of "67," "66," "65," "48," "48," "50," "56," "51" by using the code table of ASCII code.

The conversion unit 202 respectively converts "67," "66," "65," "48," "48," "50," "56," "51" to ternary numbers of "2111," "2110," "2102," "1210," "1210," "1212," "2002," "1220." The value of each digit in these ternary numbers become a value expressed in each of the cells in the cell column of the preliminary sub-code 301s. The conversion unit 202 performs the conversion process at step S104 of FIG. 13 for each digit.

Figure 18:
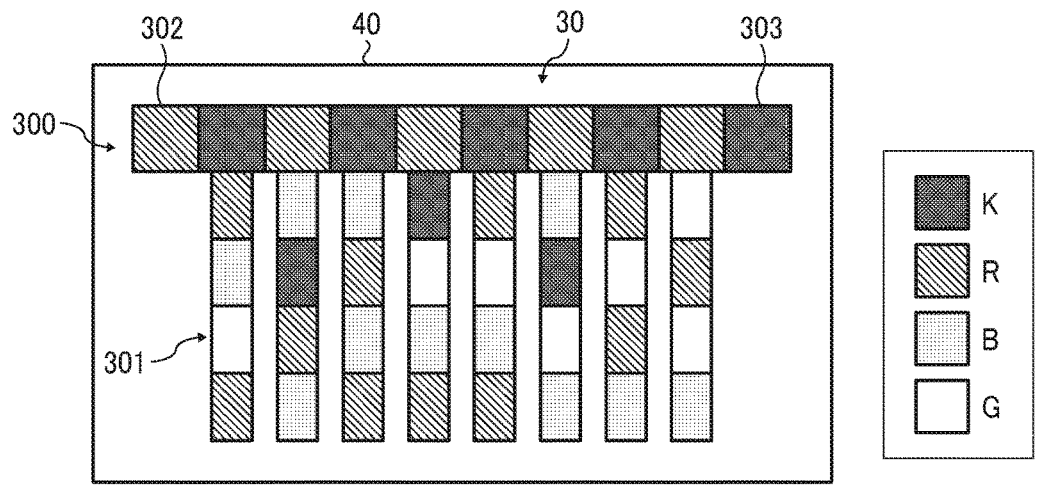
FIG. 18 illustrates an example of an optically-readable symbol of the first embodiment that is generated by encoding the information of FIG. 17 by applying the encoding procedure of FIG. 7A, and a base medium formed with the optically-readable symbol.

FIG. 18 illustrates an example of the optically-readable symbol 30 of the first embodiment that is generated by encoding the information of FIG. 17 by applying the encoding procedure of FIG. 7, and formed on the base medium 40. In this example case, the cell row of the main code 300 is composed of ten cells including the start cell 302 and the end cell 303, in which the start cell 302 is set as red (R), and then black (K) and red (R) cells are arranged alternatively.

At steps S106 to S109 of FIG. 13, the color assignment unit 203 assigns color to each digit in the ternary number, converted from each digit of the data string, by applying the conversion table stored in the table storage 204, and the color of the cell used as the transition origin. For example, a cell column of the sub-code 301 corresponding to the cell "d1" in FIG. 17 has a ternary number of "1220."

As to the cell column of the sub-code 301, the least digit (i.e., $3^0$ digit) of ternary number is assigned to a cell (i.e., front end cell) of a cell column of the sub-code 301 that is connected a cell of the cell row of the main code 300. In this case, the color assignment unit 203 acquires a color to be assigned to the front end cell of the cell column of the sub-code 301 in view of a color of the cell of the cell row of the main code 300 connected to the cell column of the sub-code 301. Specifically, the color assignment unit 203 acquires a color to be assigned to the front end cell of the cell column of the sub-code 301 by applying the conversion table to a black (K) cell of the cell row of the main code 300, connected to the cell column of the sub-code 301, in which the black (K) is used as the color of the first transition origin for the cells of the cell column of the sub-code 301. Then, the color assignment unit 203 sequentially assigns color to each of the cells of the cell column of the sub-code 301 by using a most-recently color-assigned cell as the transition origin.

In an example case of FIG. 18, each of the cells of the cell column of the sub-code 301, connected to the cell "d1" of the main code 300 corresponding to the information of FIG. 17, is respectively assigned with red (R), blue (B), green (G), and red (R) from the front end cell of the cell column of the sub-code 301. When the color assignment unit 203 completes the color assignment to the last end cell of the cell column of the sub-code 301, the color assignment unit 203 performs the color assignment for the next cell column of the sub-code 301.

The code generation apparatus 20 forms the generated optically-readable symbol 30 on the base medium 40. For example, the code generation apparatus 20 transmits the generated optically-readable symbol 30 to the printer 21 to print the generated optically-readable symbol 30 on the base medium 40 used as a print medium.

Figure 19:
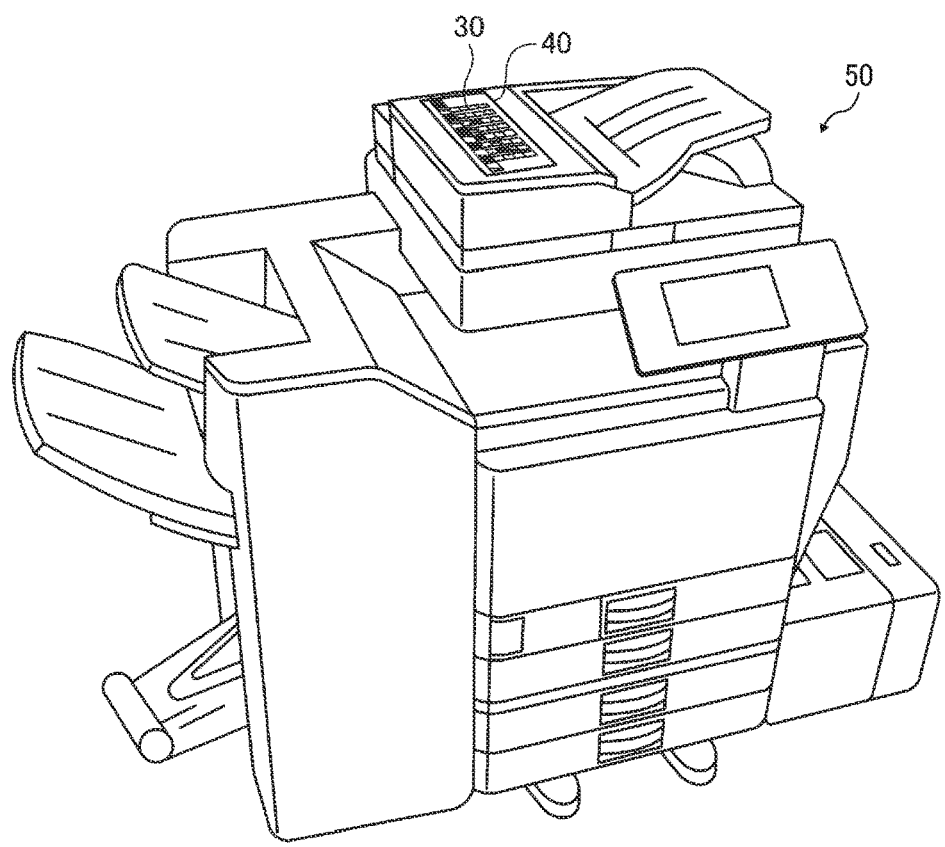
FIG. 19 schematically illustrates an example of an article attached with a base medium formed with an optically-readable symbol of the first embodiment.

FIG. 19 schematically illustrates an example of an article attached with the base medium 40 formed with the optically-readable symbol 30 of the first embodiment. In an example case of FIG. 19, the base medium 40 formed with the optically-readable symbol 30 is attached an outer face of on the article 50 such as an image forming apparatus (e.g., multi-functional copier). As one example, a data string to be encoded as the optically-readable symbol 30 can be used as identification information of the articles 50 to identify each one of the articles 50. When the base medium 40 captured by a camera, the optically-readable symbol 30 included in the captured image is recognized and decoded, and then the identification information of each one of the articles 50 can be acquired, in which no action from each one of the articles 50 is not required.

(Recognition Processing of Optically-Readable Symbol of First Embodiment)

Figure 20:
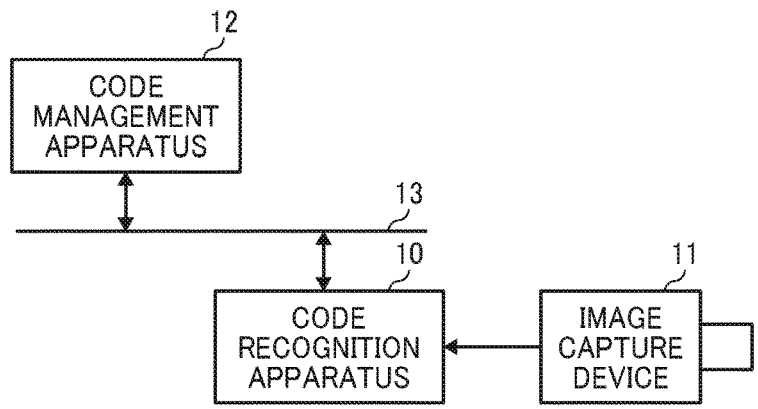
FIG. 20 illustrates an example of a configuration of a code recognition system of the first embodiment.

A description is given of a recognition processing of the optically-readable symbol 30 of the first embodiment. FIG. 20 illustrates an example of a configuration of a code recognition system applied as the first embodiment. As described in FIG. 20, the code recognition system includes, for example, the code recognition apparatus 10, the image capture device 11, and a code management apparatus 12. The code recognition apparatus 10 and the code management apparatus 12 are communicably connected with each other via a network 13. The code recognition apparatus 10 and the code management apparatus 12 can be connected with each other wirelessly or by wire. Further, the image capture device 11 can be connected to the code recognition apparatus 10 wirelessly or by wire. In this description, the plurality of apparatuses can be connected wirelessly or by wire.

As described with reference to FIG. 1, the code recognition apparatus 10 recognizes an image of the optically-readable symbol 30 included in the optically captured image captured by the image capture device 11, and decodes the image of the optically-readable symbol 30 included in the optically captured image. The code management apparatus 12 manages information obtained by decoding the optically-readable symbol 30 using the code recognition apparatus 10.

Figure 21A:
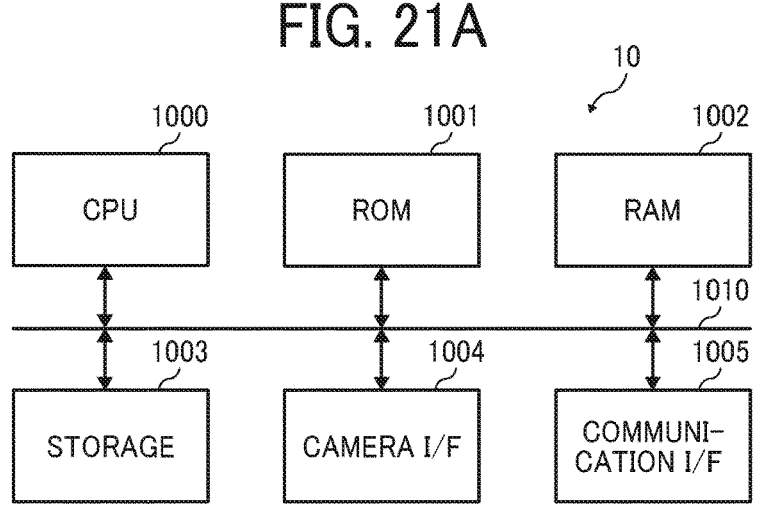
FIG. 21A illustrates an example of a hardware block diagram of a code recognition apparatus of the first embodiment.

FIG. 21A illustrates an example of a hardware block diagram of the code recognition apparatus 10 of the first embodiment. The code recognition apparatus 10 includes, for example, a central processing unit (CPU) 1000, a read only memory (ROM) 1001, a random access memory (RAM) 1002, a storage 1003, a camera interface (I/F) 1004, and a communication interface (I/F) 1005, which are communicably connected with each other via a bus 1010. The code recognition apparatus 10 can be devised by using a general computer. Further, the code recognition apparatus 10 can omit an input device such as a key board and a pointing device, and a display device such as a graphics interface (I/F) and a display.

The storage 1003 is a non-volatile memory such as a hard disk drive and a flash memory that stores programs such as a plurality of instructions, and data. The CPU 1000 controls the code recognition apparatus 10 entirely by executing programs stored in the storage 1003 and the ROM 1001 using the RAM 1002 as a working memory.

The camera I/F 1004 is connected to the image capture device 11 wirelessly or by wire. The CPU 1000 acquires an image captured by the image capture device 11 via the camera I/F 1004. Further, the CPU 1000 can control an image capturing operation of the image capture device 11 via the camera I/F 1004.

The communication I/F 1005 is connected to the network 13, and performs communication via the network 13. The network 13 can be, for example, a local area network (LAN) or the Internet. Further, the network 13 can be connected to the communication I/F 1005 wirelessly or by wire for communication.

[XXXX]追加

Figure 21B:
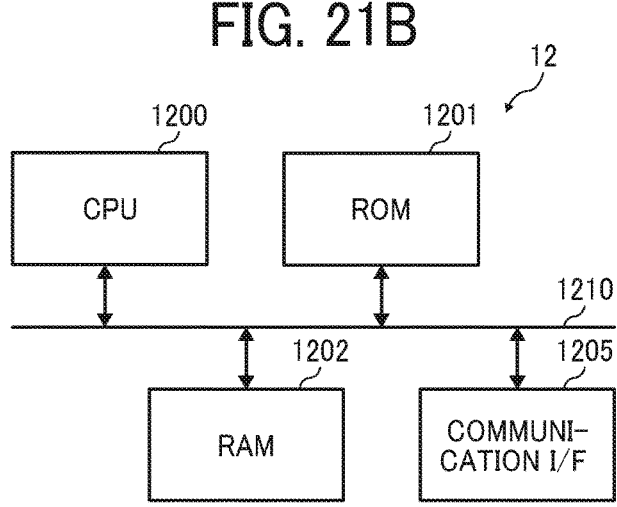
FIG. 21B illustrates an example of a hardware block diagram of a code management apparatus of the first embodiment.

FIG. 21B illustrates an example of a hardware block diagram of the code management apparatus 12 of the first embodiment. The code management apparatus 12 includes, for example, a central processing unit (CPU) 1200, a read only memory (ROM) 1201, a random access memory (RAM) 1202, and a communication interface (I/F) 1205, which are communicably connected with each other via a bus 1210. The code management apparatus 12 can be devised by using the hardware configuration of FIG. 21B.

Figure 22:
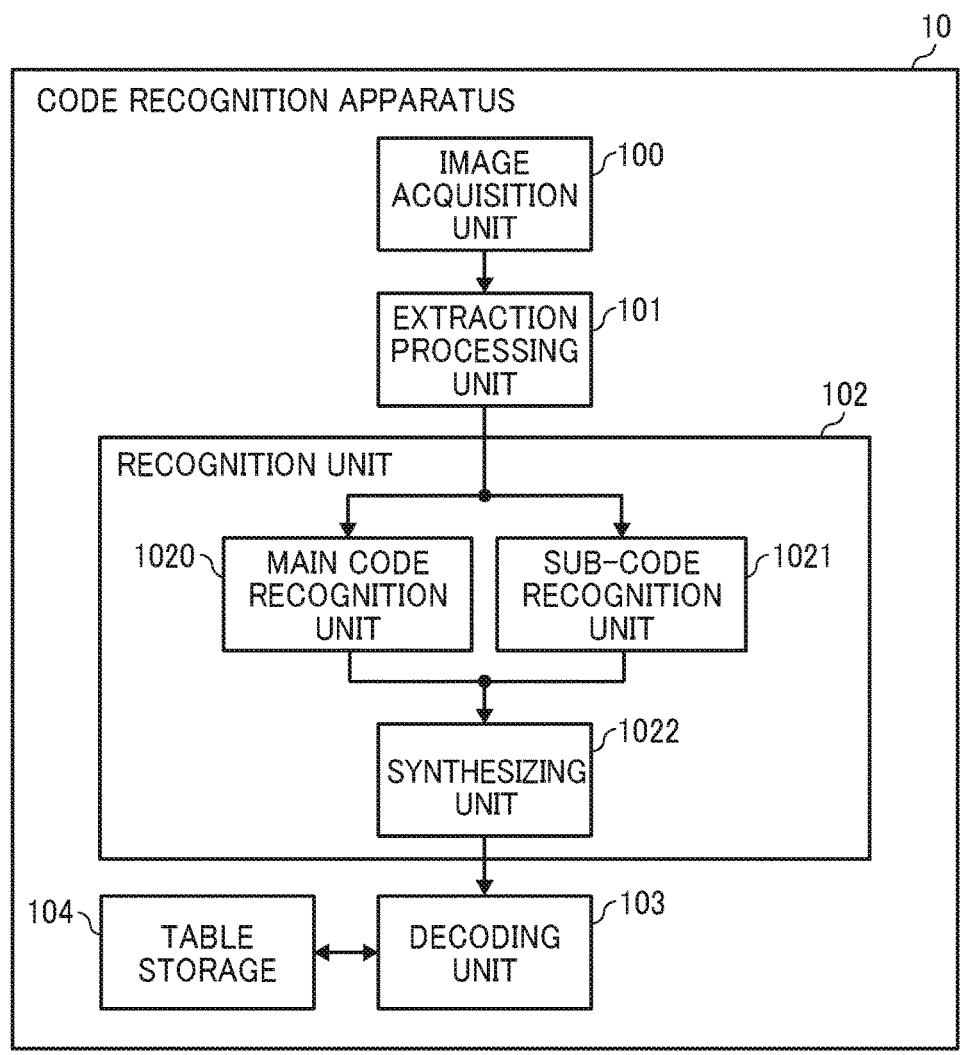
FIG. 22 is an example of a functional block diagram of the code recognition apparatus of the first embodiment.

FIG. 22 is an example of a functional block diagram of the code recognition apparatus 10 of the first embodiment. As described in FIG. 22, the code recognition apparatus 10 includes, for example, an image acquisition unit 100, an extraction processing unit 101, a recognition unit 102, a decoding unit 103, and a table storage 104.

The image acquisition unit 100, the extraction processing unit 101, the recognition unit 102 and the decoding unit 103 can be devised using programs executed by the CPU 1000, but not limited thereto. For example, a part or the entire of the image acquisition unit 100, the extraction processing unit 101, the recognition unit 102 and the decoding unit 103 can be configured as one or more hardware circuits that can collaborate with each other. Further, the table storage 104 can be devised by using a part of a memory area in the storage 1003 or the RAM 1002.

The image acquisition unit 100 acquires an image captured by the image capture device 11. The extraction processing unit 101 extracts an image of the optically-readable symbol 30 from the optically captured image acquired by the image acquisition unit 100. The recognition unit 102 performs the recognition processing to the image of the optically-readable symbol 30 extracted by the extraction processing unit 101. Specifically, the recognition unit 102 detects an image of each of the cells from the captured image of the optically-readable symbol 30. Based on color information of the detected image of each of the cells, the recognition unit 102 recognizes information obtained from a connection relationship of each of the cells, and the information set for color information set for each of the cells. Then, the recognition unit 102 generates symbol information set for the optically-readable symbol 30 based on a recognition result.

More specifically, as illustrated in FIG. 22, the recognition unit 102 includes, for example, a main code recognition unit 1020 (first recognition unit), a sub-code recognition unit 1021 (second recognition unit), and a synthesizing unit 1022. The main code recognition unit 1020 recognizes color information of cells configuring the cell row of the main code 300 from the image of the optically-readable symbol 30. The sub-code recognition unit 1021 recognizes color information of cells configuring each of the cell columns included in the sub-code 301 from the image of the optically-readable symbol 30. Specifically, the sub-code recognition unit 1021 recognizes the color information of each of the cells included in the sub-code 301 in parallel or concurrently, which means the sub-code recognition unit 1021 performs the recognition processing for each of the cells in parallel or concurrently.

The synthesizing unit 1022 synthesizes information respectively recognized by the main code recognition unit 1020 and the sub-code recognition unit 1021 as the symbol information set for the optically-readable symbol 30. The symbol information includes, for example, the color information of each of the cells included in each of the cell row of the main code 300 and the cell column of the sub-code 301 of the optically-readable symbol 30, and information of connection relationship between the cells.

The table storage 104 stores the conversion table such as the conversion table disclosed in FIGS. 4D and 7D, which are prepared in view of the number of colors assigned to each of the plurality of cells in advance. The decoding unit 103 decodes the symbol information generated by the synthesizing unit 1022 to restore the information that was encoded as the optically-readable symbol 30.

The code recognition program to implement each of capabilities of the code recognition apparatus 10 of the first embodiment can be stored in a computer readable storage medium such as compact disk (CD), flexible disk (FD), and digital versatile disk (DVD) as an installable format and executable format file, but not limited thereto. For example, the code recognition program can be stored on a computer or a storage on a network such as the Internet, and downloaded via the network as required. Further, the code recognition program can be provided or distributed via the network such as the Internet.

The code recognition program can be used to implement one or more modules including the above described image acquisition unit 100, extraction processing unit 101, recognition unit 102 and decoding unit 103. In an actual hardware configuration, when the CPU 1000 reads out the code recognition program from a memory such as the storage 1003, and executes the code recognition program, the above described image acquisition unit 100, extraction processing unit 101, recognition unit 102 and decoding unit 103 are loaded on a main memory such as the RAM 1002 to devise the above described image acquisition unit 100, extraction processing unit 101, recognition unit 102, and decoding unit 103 on the main memory.

(Recognition Processing of Optically-Readable Symbol of First Embodiment)

A description is given of the recognition and decoding processing of the optically-readable symbol 30 of the first embodiment in detail. Hereinafter, the optically-readable symbol 30 described with reference to FIG. 18 is used.

As disclosed in FIG. 18, the optically-readable symbol 30 includes the main code 300 and the sub-code 301. The main code 300 includes the start cell 302, the end cell 303, and eight cells set between the start cell 302 and the end cell 303. The sub-code 301 includes eight cell columns, and one end cell of each of the eight cell columns is respectively connected to each one of eight cells set between the start cell 302 and the end cell 303. As to the main code 300, the start cell 302 is set with red (R), and black (K) and red (R) cells are arranged alternatively. As to the sub-code 301, each of the cell columns composed of four cells expresses a ternary number by using four colors. In this description, it is assumed that the code recognition apparatus 10 already recognizes the above described configuration of the optically-readable symbol 30 in advance.

Figure 23:
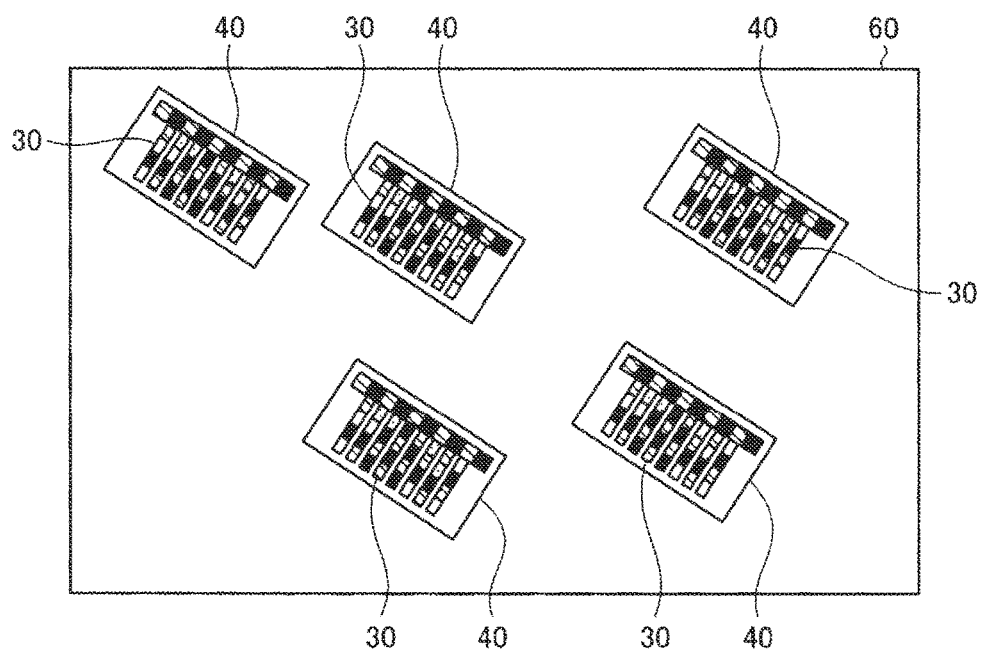
FIG. 23 illustrates an example of an image captured by an image capture device, and acquired by an image acquisition unit of the code recognition apparatus.

FIG. 23 illustrates an example of an image captured by the image capture device 11, and acquired by the image acquisition unit 100 of the code recognition apparatus 10 of the first embodiment. The image captured by the image capture device 11 is referred to as a captured image 60. In an example case of FIG. 23, the captured image 60 includes a plurality of images, in which each image includes the base medium 40, and the optically-readable symbol 30 is displayed on the base medium 40. The code recognition apparatus 10 extracts images of the optically-readable symbol 30 from the captured image 60 one by one. The code recognition apparatus 10 recognizes the color information of each of the cells included in each of the optically-readable symbols 30, and the connection relationship of each of the cells included in each of the optically-readable symbols 30 based on the extracted image of the optically-readable symbols 30, and decodes each of the optically-readable symbols 30 based on recognition results.

Figure 24:
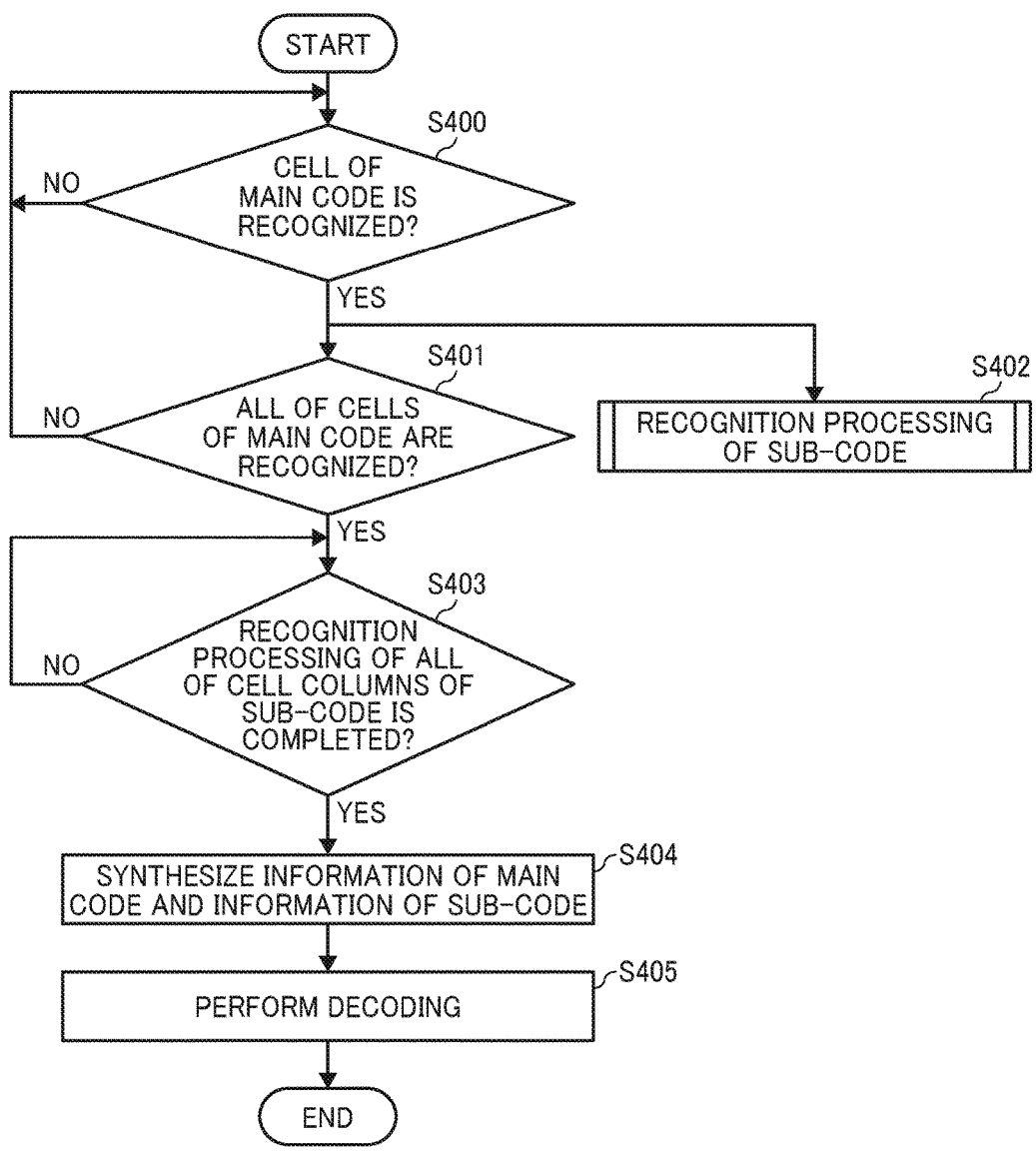
FIG. 24 is an example of a flow chart illustrating steps of a process of recognizing and decoding an optically-readable symbol by using the code recognition apparatus of the first embodiment.

FIG. 24 is an example of a flow chart illustrating steps of a process of recognizing and decoding the optically-readable symbol 30 by using the code recognition apparatus 10 of the first embodiment. As described in FIG. 24, at step S400, in the code recognition apparatus 10, the recognition unit 102 performs the recognition processing to the optically-readable symbol 30 to determine whether each one of cells in the main code 300 is recognized.

More specifically, at step S400, in the code recognition apparatus 10, the extraction processing unit 101 extracts the image of the optically-readable symbol 30 from the captured image 60, and the main code recognition unit 1020 of the recognition unit 102 performs the recognition processing of each one of cells in the main code 300 from the extracted image of the optically-readable symbol 30 to determine whether a cell other than the start cell 302 and the end cell 303 is recognized for the main code 300. When the main code recognition unit 1020 determines that the cell other than the start cell 302 and the end cell 303 is not recognized (S400: NO), the recognition unit 102 returns the sequence to step S400, and continues the recognition processing of the cell of the main code 300.

When the main code recognition unit 1020 determines that the cell other than the start cell 302 and the end cell 303 is recognized (S400: YES), the recognition unit 102 acquires color information and connection information of the recognized cell, and proceeds the sequence to steps S401 and S402.

The connection information includes, for example, information indicating a currently recognized cell, and information indicating a most-recently recognized cell adjacent to the currently recognized cell. For example, the recognition unit 102 recognizes a sequential order of each of the cells (e.g., serial numbers) by using the main code recognition unit 1020 and the sub-code recognition unit 1021 as identification information of each of the cells. Therefore, the identification information can be used as information indicating each of the cells.

At steps S401, the main code recognition unit 1020 determines whether all of the cells of the cell row of the main code 300 are recognized. When the main code recognition unit 1020 determines that all of the cells of the cell row of the main code 300 are not yet recognized (S401: NO), the recognition unit 102 returns the sequence to step S400, and continues the recognition processing of the cell of the main code 300.

By contrast, when the main code recognition unit 1020 determines that all of the cells of the cell row of the main code 300 are recognized (S401: YES), the recognition unit 102 proceeds the sequence to step S403.

For example, it is assumed that the cell row of the main code 300 includes first color cells and second color cells arranged alternatively, and the number of the cells included in the cell row of the main code 300 is known. In this case, when the main code recognition unit 1020 counts the number of times of the color transition between the adjacent cells of the cell row of the main code 300, the main code recognition unit 1020 can determine whether the main code recognition unit 1020 recognizes all of the cells of the cell row of the main code 300. Further, the main code recognition unit 1020 can recognize the number of times of the color transition between the adjacent cells of the cell row of the main code 300 as information expressed by the cell row of the main code 300.

A description is given using an example of FIGS. 17 and 18. When the main code recognition unit 1020 counts the color transition for nine times for the main code 300 including the start cell 302 and the end cell 303, the main code recognition unit 1020 can determine that all of the cells of the cell row in the main code 300 are recognized. Further, the main code recognition unit 1020 can recognize that a value obtained by subtracting one from the number of times of the color transition as information expressed by the number of cells of the cell row of the main code 300 set between the start cell 302 and the end cell 303, which means the information expressed by the number of cells of the cell row of the main code 300 set between the start cell 302 and the end cell 303 is recognized as the number of digits of the optically-readable symbol 30.

Further, at step S402, the sub-code recognition unit 1021 of the recognition unit 102 performs the recognition processing for the cells of the sub-code 301. More specifically, when one cell of the main code 300 is recognized by the main code recognition unit 1020 at step S400, at step S402, the sub-code recognition unit 1021 performs the recognition processing for each of the cells of a cell column of the sub-code 301 that is connected to the one cell of the main code 300 recognized at step S400 by the main code recognition unit 1020, in which the cell column of the sub-code 301 is processed as a process target.

Figure 25:
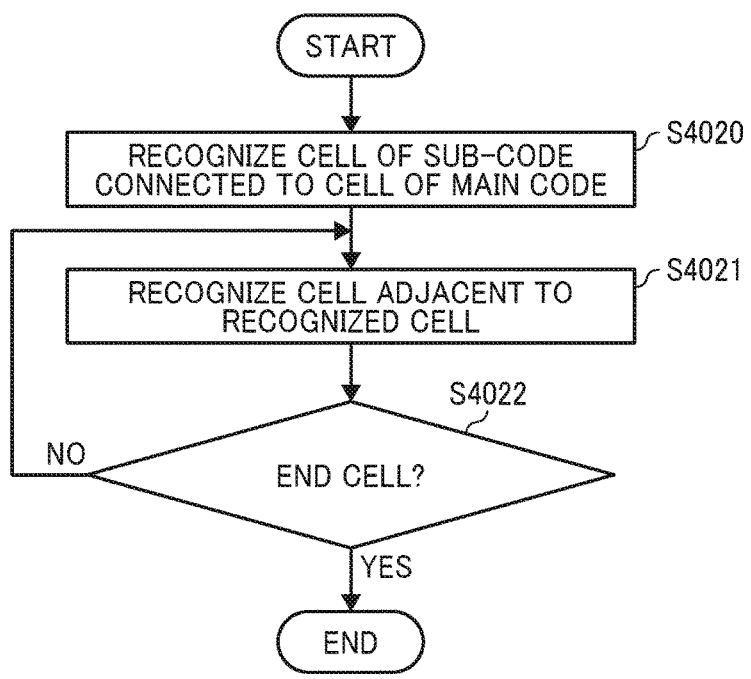
FIG. 25 is an example of a flow chart illustrating steps of a process of a recognition by a sub-code recognition unit at step S402 of FIG. 24.

FIG. 25 is an example of a flow chart illustrating steps of a recognition processing by the sub-code recognition unit 1021 at step S402 of the first embodiment. At step S4020, the sub-code recognition unit 1021 recognizes a cell in the sub-code 301 that is connected to the cell of the main code 300 recognized at step S400, in which the cell column of the sub-code 301 including the cell recognized by the sub-code recognition unit 1021 is set as the process target, and the sub-code recognition unit 1021 acquires color information and connection information of the cell recognized by the sub-code recognition unit 1021. At step S4021, the sub-code recognition unit 1021 recognizes a cell adjacent to the cell recognized at step S4020 (i.e., the most recent process) for the same cell column of the sub-code 301 set as the process target, and the sub-code recognition unit 1021 acquires color information and connection information of the cell adjacent to the cell recognized at step S4020.

At step S4022, the sub-code recognition unit 1021 determines whether the cell recognized at step S4021 is the last end cell of the cell column of the sub-code 301 set as the process target. When the sub-code recognition unit 1021 determines that the cell recognized at step S4021 is not the last end cell of the cell column of the sub-code 301 set as the process target (S4022: NO), the sub-code recognition unit 1021 returns the sequence to step S4021, and the sub-code recognition unit 1021 performs the recognition processing for a cell adjacent to the cell recognized most recently at step S4021. By contrast, when the sub-code recognition unit 1021 determines that the cell recognized at step S4021 is the last end cell of the cell column of the sub-code 301 set as the process target (S4022: YES), the sub-code recognition unit 1021 ends the sequence of FIG. 25.

Further, for example, when the sub-code recognition unit 1021 recognizes that the number of times of the color transition becomes a pre-set number at step S4021, at step S4022, the sub-code recognition unit 1021 determines that the recognized cell is the last end cell of the cell column of the sub-code 301 set as the process target, but not limited thereto. For example, at step S4022, the sub-code recognition unit 1021 can determine whether the recognized cell is the last end cell of the cell column of the sub-code 301 based on a connection number of the cell adjacent to the cell recognized most recently at step S4021.

The sequence of FIG. 25 is performed in parallel or concurrently for the plurality of cell columns included in the sub-code 301. For example, each time the main code recognition unit 1020 recognizes a cell at step S400 of FIG. 24, the sub-code recognition unit 1021 performs the process of step S402, which is the sequence of FIG. 25.

A description is returned to the sequence of FIG. 24. At step S403, the recognition unit 102 determines whether the processing to all of the cell columns of the sub-code 301, connected to the cell row of the main code 300, is completed. For example, the recognition unit 102 checks or monitors the processing at steps S400 and S401 by the main code recognition unit 1020, and the processing at step S402 by the sub-code recognition unit 1021. The recognition unit 102 determines whether the processing at step S402 for the cell column of the sub-code 301, connected to the last cell of the main code 300 recognized at steps S400 and S401, is completed. When the recognition unit 102 determines that the processing at step S402 is not yet completed (S403: NO), the recognition unit 102 returns the sequence to step S403, and waits the completion of the processing of step S402.

By contrast, when the recognition unit 102 determines that the processing at step S402 for all of the cell columns of the sub-code 301, connected to the cell row of the main code 300, is completed (S403: YES), the recognition unit 102 proceeds the sequence to step S404.

At step S404, the synthesizing unit 1022 of the recognition unit 102 synthesizes information acquired by detecting the cell row of the main code 300 and information acquired by detecting the plurality of cell columns included in the sub-code 301, and generates the synthesized information as the symbol information set for the optically-readable symbol 30. More specifically, the synthesizing unit 1022 performs the synthesizing process of the information included in the main code 300 and the information included in the sub-code 301 based on the connection information of each of the cells acquired at steps S400, S401, and S402.

Figures 26A, 26B, 26C, 26D:
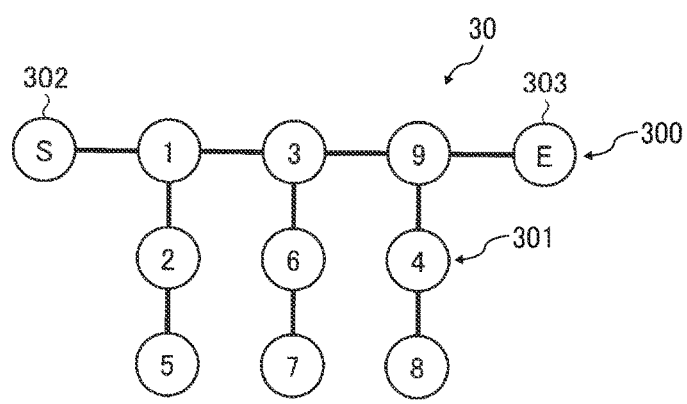
FIG. 26A illustrates an example of connection information between cells defined by labels.
FIG. 26B illustrates an example of a list of connection number set for each of cells.
FIG. 26C illustrates an example of connection pattern of each of cells.
FIG. 26D illustrates an example of an optically-readable symbol generated by a synthesizing unit.

A description is given of the synthesizing process of the symbol information set for the optically-readable symbol 30 based on the connection information by using the synthesizing unit 1022 of the first embodiment with reference to FIG. 26. In this example case, it is assumed that the optically-readable symbol 30 includes one cell row for the main code 300 and three cell columns for the sub-code 301 as illustrated in FIG. 26D.

As illustrated in FIG. 26D, the cell row of the main code 300 includes the start cell 302 and the end cell 303, and three cells between the start cell 302 and the end cell 303, in which each of the cells is respectively indicated with a circle that encircles a numbered label. Further, each of the cell columns of the sub-code 301 includes two cells. Further, as illustrated in FIG. 26D, a number (i.e., label) set for each of the cells is used as identification information, which is set for each of the cells based on, for example, the recognized sequential order of each of the cells. The label of the start cell 302 and the label of the end cell 303 are respectively set as "S" and "E."

FIG. 26A illustrates an example of the connection information set for the cells identified by the labels. In FIG. 26A, two cells included in each one of parentheses "( )" indicate that the two cells are connected with each other, wherein each cell is indicated with the label. For example, as illustrated in FIG. 26A, the label #1 cell and the label #2 cell are connected with each other. Similarly, the label #5 cell and the label #2 cell are connected with each other, the label #3 cell and the label #9 cell are connected with each other, the label #1 cell and the label #3 cell are connected with each other, the label #1 cell and the label #S cell are connected with each other, the label #8 cell and the label #4 cell are connected with each other, the label #3 cell and the label #6 cell are connected with each other, the label #6 cell and the label #7 cell are connected with each other, the label #9 cell and the label #4 cell are connected with each other, and the label #9 cell and the label #E cell are connected with each other.

Based on the connection information set for the cells (FIG. 26A), the synthesizing unit 1022 acquires the connection number indicating the number of other cells connected to each one of the cells. FIG. 26B illustrates an example of a list of the connection number set for each of the cells having the labels #1 to #9, in which each of the labels #1, #3 or #9 cells has the connection number "3," each of the labels #2, #4 or #6 cells has the connection number "2," and each of the label #5, #7 or #8 cells has the connection number "1."

The synthesizing unit 1022 calculates a connection pattern of each of the cells (i.e., connection pair of cells) based on the connection information set for each of the cells described in FIG. 26A, and the connection number of each of the cells described in FIG. 26B. Specifically, as described with reference to FIG. 16, a cell having the connection number "3" is used as a cell of the cell row of the main code 300, and a cell having the connection number "2" is used as a cell included in each of the cell columns of the sub-code 301 but not used as the last end cell of the sub-code 301. Further, a cell having the connection number "1" is used as the last end cell of each of the cell columns of the sub-code 301. Further, the start cell 302 and the end cell 303 also have the connection number "1." However, since the start cell 302 and the end cell 303 are set with the label #S and #E, distinguished from other cells, the start cell 302 and the end cell 303 are not required to be considered in this process.

Based on the connection information set for each of the cells (FIG. 26A), and the connection numbers of each of the cells (FIG. 26B), the synthesizing unit 1022 generates the connection relationship in the stem that is the connection relationship of each of the cells in the cell row of the main code 300 as a connection pattern of each of the cells having the labels #1, #3 and #9 as described in FIG. 26C. Further, the synthesizing unit 1022 generates the connection relationship in each of the branches that is the connection relationship of each of the cells in each of the cell columns of the sub-code 301 as a connection pattern of each of the cells having the labels #2 and #5, the labels #4 and #8, and the labels #6 and #7. Further, the synthesizing unit 1022 connects each of the cell columns of the sub-code 301 to each of the cells of the cell row of the main code 300 based on the connection relationship of each of the cells in the stem, and the connection relationship of each of the cells in the branches.

The synthesizing unit 1022 acquires information included in the cell row of the main code 300 (i.e., first information) and information included in each of the cell columns of the sub-code 301 (i.e., second information) based on a configuration that each of the cell columns of the sub-code 301 is connected to each of the cells of the cell row of the main code 300. The synthesizing unit 1022 synthesizes the acquired information to generate the symbol information set for the optically-readable symbol 30 as synthesized information. As described above, the symbol information includes the color information of each of the cells, and the connection relationship information set for the cells in each of the cell row of the main code 300 and each of the cell columns of the sub-code 301 of the optically-readable symbol 30. In this configuration, the synthesizing unit 1022 can be configured to acquire identification information included in the optically-readable symbol 30 based at least in part on the recognized first information and the recognized second information.

A description is returned to the sequence of FIG. 24. At step S404, the synthesizing unit 1022 synthesizes information based on the cell row of the main code 300 and information based on each of the cell columns of the sub-code 301 to generate the symbol information set for the optically-readable symbol 30. At step S405, the decoding unit 103 performs the decoding process of the symbol information synthesized at step S404 to restore the original information.

More specifically, the decoding unit 103 decodes the symbol information generated at step S404 by the synthesizing unit 1022 by applying the conversion table stored in the table storage 104. The decoding unit 103 acquires values of adjacent two cells of each of the cell columns of the sub-code 301 in the optically-readable symbol 30 by cross-referencing the conversion table and the color information of each of the cells in the symbol information, in which a cell closer to the cell row of the main code 300 is used as the transition origin of the adjacent two cells.

When the values are acquired for each of the cells of one cell column of the sub-code 301, the values acquired for each of the cells are used as values of each of digit of a number expressed by the one cell column of the sub-code 301 such as a ternary number. The decoding unit 103 adds the values acquired for each of cells to calculate a value of the cell column, in which the value of the cell column is calculated, for example, as a ternary number. The decoding unit 103 restores original information such as characters from the calculated value of the cell column by applying, for example, a code table. The decoding unit 103 performs this processing for all of the cell columns of the sub-code 301 to decode the optically-readable symbol 30 (i.e., encoded data) to restore the original data string.

After completing the decoding process at step S405, the sequence of FIG. 24 is completed.

As to the optically-readable symbol 30 of the first embodiment, the plurality of cell columns of the sub-code 301 is connected to the cell row of the main code 300, and the decoding process of the plurality of cell columns of the sub-code 301 can be performed in parallel or concurrently, with which the decoding process can be processed faster.

(Extraction Process of Optically-Readable Symbol of First Embodiment)

A description is given of an extraction process of the optically-readable symbol 30 of the first embodiment, in which the optically-readable symbol 30 is extracted from the captured image 60. As to the first embodiment, the extraction process of the optically-readable symbol 30 employs any one of a first extraction process (1) and a second extraction process (2), wherein the first extraction process (1) uses a template matching using a template, and the second extraction process (2) uses continuity of color of pixels.

(First Extraction Process)

Figure 27A:
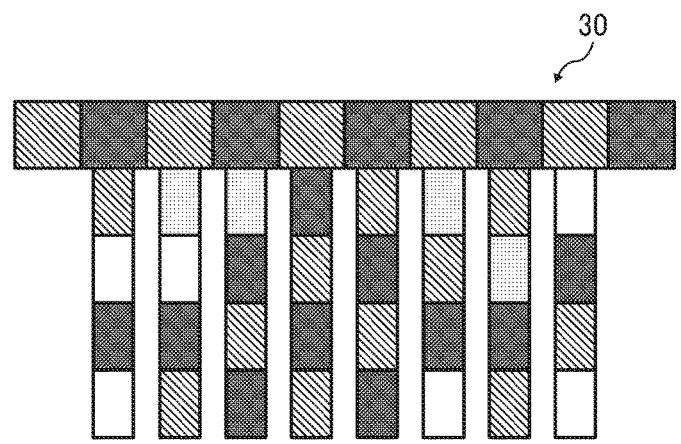
FIG. 27A illustrates an example of an optically-readable symbol having a comb shape.

A description is given of the first extraction process. As to the first extraction process, it is assumed that a shape of the optically-readable symbol 30 is already known, and a template having a shape corresponding to the shape of the optically-readable symbol 30 is prepared. FIG. 27 illustrates an example of a template used for the first extraction process of the first embodiment. FIG. 27A illustrates an example of the optically-readable symbol 30 having a known shape such as a comb shape.

Figure 27B:
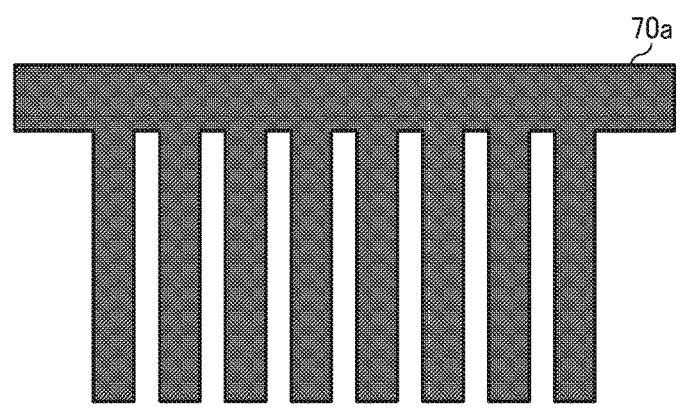
FIG. 27B illustrates an example of a template, which is a binarized image.
Figure 27C:
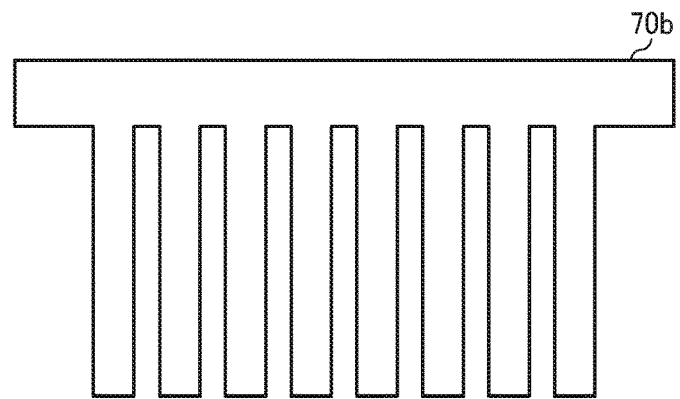
FIG. 27C illustrates another example of a template prepared by detecting edges.

FIG. 27B illustrates an example of a template 70a, which is a binarized image. The template 70a can be prepared, for example, by binarizing the optically-readable symbol 30 of FIG. 27A, in which the optically-readable symbol 30 is binarized by comparing a brightness value of the optically-readable symbol 30 with a given threshold. FIG. 27C illustrates an example of a template 70b prepared by detecting edges. The template 70b can be prepared, for example, by converting the optically-readable symbol 30 of FIG. 27A to a greyscale image, by performing the edge detection process to the greyscale image using a known method, and by generating the template 70b based on the detected edge information.

The first extraction process can be performed by using any one of the templates 70a and 70b. Hereinafter, the first extraction process using the template 70a is described.

Figure 28:
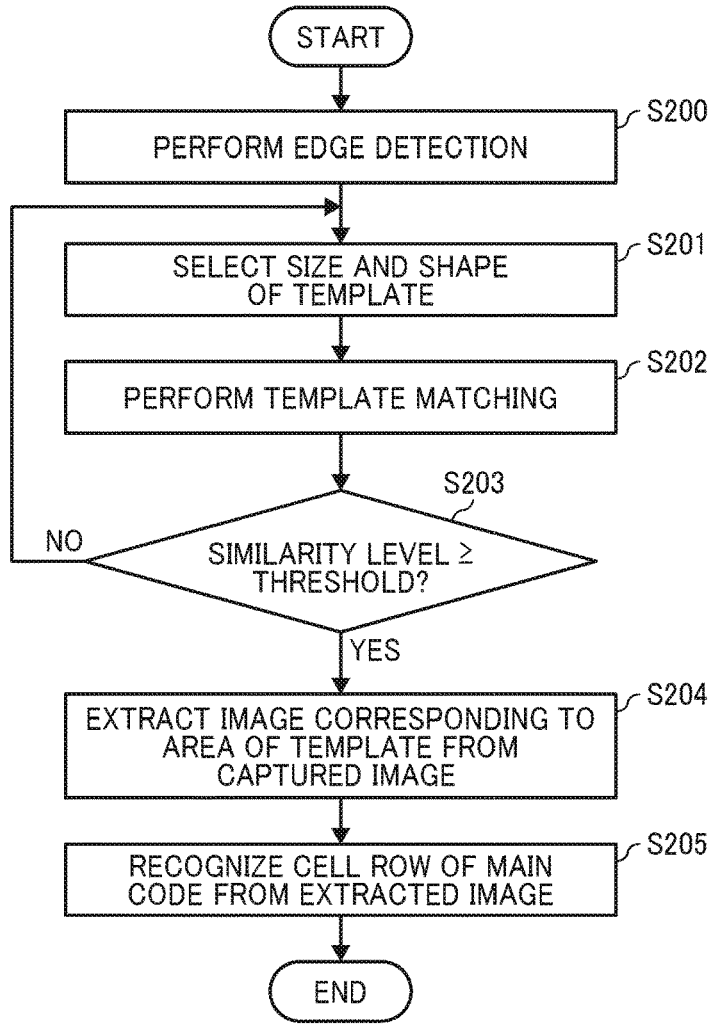
FIG. 28 is an example of a flow chart illustrating steps of a first extraction process of the first embodiment.

FIG. 28 is an example of a flow chart illustrating steps of the first extraction process of the first embodiment. The sequence of FIG. 28 corresponds to step S400 in the above described sequence of FIG. 24.

At step S200, in the code recognition apparatus 10, the extraction processing unit 101 performs the edge detection to the captured image 60 (FIG. 23) by using a known method. At step S201, the extraction processing unit 101 selects a size and a shape of the template 70a to be used for the first extraction process. The direction and size of the image of the optically-readable symbol 30 included in the captured image 60 change depending on a distance between the image capture device 11 and the optically-readable symbol 30 when capturing an image, an angle of view of the image capture device 11, and an image capture angle when the image capture device 11 captures an image. Therefore, the extraction processing unit 101 prepares the template 70a for a plurality of numbers having different sizes, and the extraction processing unit 101 selects a size and a shape of the template 70a.

At step S202, the extraction processing unit 101 performs the template matching to the captured image 60 by using a known method, and the template 70a selected at step S201 to calculate a similarity level. For example, the extraction processing unit 101 applies the template 70a selected at step S201 to the captured image 60 to calculate the similarity level at each position of the optically-readable symbol 30.

At step S203, based on the similarity level calculated at step S202, the extraction processing unit 101 determines whether the similarity level is a threshold or more. When the similarity level is a threshold or more (S203: YES), it is determined that the captured image of the optically-readable symbol 30 and the template 70a have an effective similarity level. In this process, since the optically-readable symbol 30 has the comb shape as above described, the image of the optically-readable symbol 30 included in the captured image 60, and an image other than the optically-readable symbol 30 can be distinguished easily, with which the similarity determination based on the similarity level can be performed with a higher precision. When the extraction processing unit 101 determines that the similarity level is less than the threshold (S203: NO), the extraction processing unit 101 returns the sequence to step S201, and performs the template matching (S202) again after selecting another size and another shape for the template 70a (S201).

By contrast, when the extraction processing unit 101 determines that the similarity level is the threshold or more (S203: YES), the extraction processing unit 101 proceeds the sequence to step S204. When step S203 is YES, the extraction processing unit 101 determines that the similarity level of an area of the template 70a positioned on the captured image 60 becomes the threshold or more. At step S204, the extraction processing unit 101 extracts an image corresponding to the area of the template 70a applied to the captured image 60 from the captured image 60. At step S205, in the code recognition apparatus 10, the main code recognition unit 1020 of the recognition unit 102 recognizes the color information of the cells configuring the cell row of the main code 300 from the image extracted at step S204.

When the color information of the cells configuring the cell row of the main code 300 is recognized at step S205, the sequence of FIG. 28 is completed.

Figure 29A:
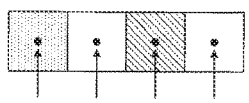
FIG. 29A illustrates an example of a method of acquiring color information from each of cells based on an image of an optically-readable symbol extracted by the first extraction process.
Figure 29B:
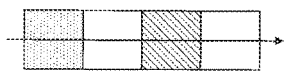
FIG. 29B illustrates an example of another method of acquiring color information from each of cells based on an image of an optically-readable symbol extracted by the first extraction process.

FIG. 29 illustrates example methods of acquiring color information of each of the cells from the image of the optically-readable symbol 30 extracted by the first extraction process of the first embodiment. FIG. 29A illustrates an example method of acquiring color information from a pixel positioned at one point in each of the cells. FIG. 29B illustrates another example method of acquiring color information from positions continued for a plurality of pixels in each of the cells included in a cell line by scanning the cell line along a cell connection direction.

The acquiring method of FIG. 29A can be performed with a faster speed. When the acquiring method of FIG. 29A is applied to the optically-readable symbol 30 having each of the cells with the same size, and the captured image 60 has little distortion, the color information can be acquired faster. By contrast, the acquiring method of FIG. 29B requires a longer time period compared to the acquiring method of FIG. 29A while the acquiring method of FIG. 29B can acquire the color information with higher precision even if the size of each of the cells is not the same, and even if the captured image 60 has greater image distortion. Further, the acquiring method of FIG. 29B can be performed with higher precision even if color unevenness occurs to the captured image 60.

The acquiring method of FIG. 29A and the acquiring method of FIG. 29B can be selected based on an image capturing condition of the captured image 60 or the like.

(Second Extraction Process)

A description is given of the second extraction process (2). In the second extraction process, the color information is recognized for each of the pixels of the captured image 60. When a color information of a target pixel and a color information of a pixel adjacent to the target pixel are the same color, the target pixel and the adjacent pixel are labeled as one area.

FIG. 30 is an example of a flow chart illustrating steps of the second extraction process of the first embodiment. The sequence of FIG. 30 corresponds to step S400 of the sequence of FIG. 24.

At step S300, in the code recognition apparatus 10, the extraction processing unit 101 randomly selects a pixel from the captured image 60 as a target pixel. Further, at step S300, the extraction processing unit 101 can select a specific pixel in the captured image 60 as the target pixel.

At step S301, the extraction processing unit 101 recognizes color information of the target pixel selected at step S300. At step S302, the extraction processing unit 101 determines whether the color information of the selected target pixel matches any one of the color information of composition colors of the optically-readable symbol 30 such as any one of red (R), green (G), blue (B) and black (K). For example, when a color value of one color information is within a given range from a color value of another color information, the extraction processing unit 101 determines that the one color information matches another color information. When the extraction processing unit 101 determines that the color information of the selected target pixel does not match the color information of composition colors of the optically-readable symbol 30 (S302: NO), the extraction processing unit 101 returns the sequence to step S300, and selects another pixel as a new target pixel.

By contrast, when the extraction processing unit 101 determines that the color information of the selected target pixel matches the color information of composition colors of the optically-readable symbol 30 (S302: YES), the extraction processing unit 101 proceeds the sequence to step S303. At step S303, the labeling process is performed for each of the pixels based on the color information of the target pixel, and the color information of an adjacent pixel adjacent to the target pixel, which means at step S303, the cells included in the optically-readable symbol 30 are identified. The step S303 includes steps S3030 to S3037 as one sequential process.

A description is given of step S303 in detail. At step S3030, the extraction processing unit 101 performs the labeling process to the target pixel to assign a specific label to the target pixel. The labeling process is performed by correlating coordinate information of the target pixel in the captured image 60 processed for the labeling, the color information of the target pixel, and the specific label. After performing the labeling process, the extraction processing unit 101 stores information of the target pixel labeled with the specific label in, for example, the RAM 1002.

At step S3031, the extraction processing unit 101 adjusts one or more parameters used for recognizing the color information. For example, the extraction processing unit 101 respectively adjusts a threshold used for recognizing each of red (R), green (G), blue (B) and black (K) at step S3031.

At step S3032, the extraction processing unit 101 determines whether an unprocessed adjacent pixel exists for the target pixel. The extraction processing unit 101 checks whether a label is assigned to the adjacent pixel of the target pixel based on the coordinate of the adjacent pixel, in which the adjacent pixel is a determination process target. If the label is not yet assigned to the adjacent pixel, the extraction processing unit 101 determines that the adjacent pixel is the unprocessed adjacent pixel. When the extraction processing unit 101 determines that the unprocessed adjacent pixel does not exist (S3032: NO), the extraction processing unit 101 proceeds the sequence to step S3034.

By contrast, when the extraction processing unit 101 determines that the unprocessed adjacent pixel still exists (S3032: YES), the extraction processing unit 101 proceeds the sequence to step S3033. At step S3033, the extraction processing unit 101 stores coordinate of the unprocessed adjacent pixel in a coordinate storage. The coordinate storage can be devised by using a part of a memory area in the RAM 1002 and/or the storage 1003. At step S3033, coordinate of the unprocessed adjacent pixel having the color information not matching the color information of composition colors of the optically-readable symbol 30 is also stored in the coordinate storage.

At step S3034, the extraction processing unit 101 determines whether the coordinate of the unprocessed adjacent pixel is stored in the coordinate storage. When the extraction processing unit 101 determines that the coordinate of the unprocessed adjacent pixel is stored in the coordinate storage (S3034: YES), the extraction processing unit 101 proceeds the sequence to step S3035. At step S3035, the extraction processing unit 101 selects one pixel among the unprocessed adjacent pixels, in which the extraction processing unit 101 selects the one pixel having the same color of the target pixel by setting a priority for the one pixel having the same color of the target pixel.

At step S3036, the extraction processing unit 101 recognizes the color information of the unprocessed adjacent pixel selected at step S3035. At step S3037, the extraction processing unit 101 determines whether the color information recognized at step S3036 matches the color information of the composition colors of the optically-readable symbol 30.

When the extraction processing unit 101 determines that the color information recognized at step S3036 matches the color information of the composition colors of the optically-readable symbol 30 (S3037: YES), the extraction processing unit 101 returns the sequence to step S3030, and performs the labeling process for the unprocessed adjacent pixel by setting the unprocessed adjacent pixel as a new target pixel.

In the labeling process, when the color information of the new target pixel matches the color information of the most-recent target pixel processed most-recently, the extraction processing unit 101 assigns the same label to the new target pixel, which is the same label assigned to the most-recent target pixel processed most-recently. By contrast, when the color information of the new target pixel differs from the color information of the most-recent target pixel processed most-recently, the extraction processing unit 101 assigns a new label to the new target pixel, which is different from the label assigned to the most-recent target pixel processed most-recently. Therefore, at step S3030, the extraction processing unit 101 assigns a specific label to a group of pixels having the continuous coordinates and the matched color information.

By contrast, when the extraction processing unit 101 determines that the color information recognized at step S3036 does not match the color information of the composition colors of the optically-readable symbol 30 (S3037: NO), the extraction processing unit 101 returns the sequence to step S3034. When the extraction processing unit 101 determines that the coordinate of the unprocessed adjacent pixel is stored in the coordinate storage (S3034: YES), at step S3035, the extraction processing unit 101 selects another unprocessed adjacent pixel different from the unprocessed adjacent pixel selected at the most-recent processing.

When the extraction processing unit 101 determines that the coordinate of the unprocessed adjacent pixel is not stored in the coordinate storage (S3034: NO), the extraction processing unit 101 proceeds the sequence to step S304 directly without performing steps S3035 to 3037 in step S303. Specifically, when the unprocessed adjacent pixel does not exist at step S3032 and the coordinate of the unprocessed adjacent pixel is not stored in the coordinate storage at step S3034, the extraction processing unit 101 proceeds the sequence to step S304 directly without performing steps S3035 to 3037 in step S303.

At step S304, in the code recognition apparatus 10, the main code recognition unit 1020 determines whether a configuration set by each of the pixel groups respectively assigned with the specific label at the labeling process (step S303) matches the connection information of the cells of the main code 300.

When the plurality of pixel groups is respectively assigned with the specific label at step S303 (labeling process), at step S304, the main code recognition unit 1020 determines whether the connection relationship between the plurality of pixel groups completely matches the connection information of each of the cells in the cell row of the main code 300. The connection relationship between the plurality of pixel groups can be determined, for example, based on the coordinate and the color of each of the pixels having received the labeling process.

When the main code recognition unit 1020 determines that the configuration set by each of the pixel groups respectively assigned with the specific label does not match the connection information of the cells of the main code 300 (S304: NO), the main code recognition unit 1020 returns the sequence to step S300, in which the pixel selected at step S300 is determined as the pixel not composing the optically-readable symbol 30.

By contrast, when the main code recognition unit 1020 determines that configuration set by each of the pixel groups respectively assigned with the specific label matches the connection information of the cells of the main code 300 (S304: YES), the sequence of FIG. 30 is completed. In this case, at least the extraction process of the main code 300 of the optically-readable symbol 30 is completed.

Further, when the labeling process is performed at step S303, based on the connection relationship of one pixel group assigned with the specific label and other pixel group connected to the one pixel group, the main code recognition unit 1020 can recognize that the one pixel group corresponds to the cells of the main code 300. When the one pixel group is recognized as the cell of the main code 300 (S400: YES), the sequence proceeds to step S402 based on the determination at step S400 (FIG. 24), and the cell in the sub-code 301 is processed.

In this case, for example, the code recognition apparatus 10 can perform the extraction process of the cell column of the sub-code 301 by separately performing the sequence of FIG. 30 for the cell column of the sub-code 301. For example, the extraction processing unit 101 selects a pixel at step S300 adjacent to the pixel group recognized as the cell of the main code 300. Further, the determination at step S304 is performed by the sub-code recognition unit 1021, in which the sub-code recognition unit 1021 determines whether a configuration set by each of the pixel groups respectively assigned with a specific label matches the connection information of the cells of the sub-code 301.

As to the code recognition apparatus 10, each time a cell of the main code 300 is recognized by the main code recognition unit 1020, the sequence of FIG. 30 can be separately performed for the cell columns of the sub-code 301 in parallel or concurrently. With this configuration, the recognition processing can be performed faster.

Further, at step S303 in FIG. 30, when the color information of the adjacent pixel adjacent to the target pixel matches the color information of the composition colors of the optically-readable symbol 30, the labeling process is performed by setting the adjacent pixel as a new target pixel, and then the area to assign the same label is enlarged sequentially, in which the enlargement of the area is not performed for an adjacent pixel having a color not matching the color information of the composition colors of the optically-readable symbol 30. By limiting the area to perform the labeling process, the labeling process can be performed faster.

Variant of First Embodiment

A description is given of a variant of the first embodiment. In the first embodiment, the optically-readable symbol 30 includes the main code 300 and the sub-code 301, in which the main code 300 includes the cell row arranging a plurality of cells with a straight pattern while the sub-code 301 includes a plurality of cell columns respectively arranging a plurality of cells with a straight pattern, and one end cell of the cells included in each of the cell columns is connected to each of the cells set between the start cell 302 and the end cell 303 of the main code 300. The shape of the optically-readable symbol 30 is not limited thereto. For example, the cell row of the main code 300 and each of the cell columns of the sub-code 301 can be respectively arranged with a non-straight pattern.

Figure 31A:
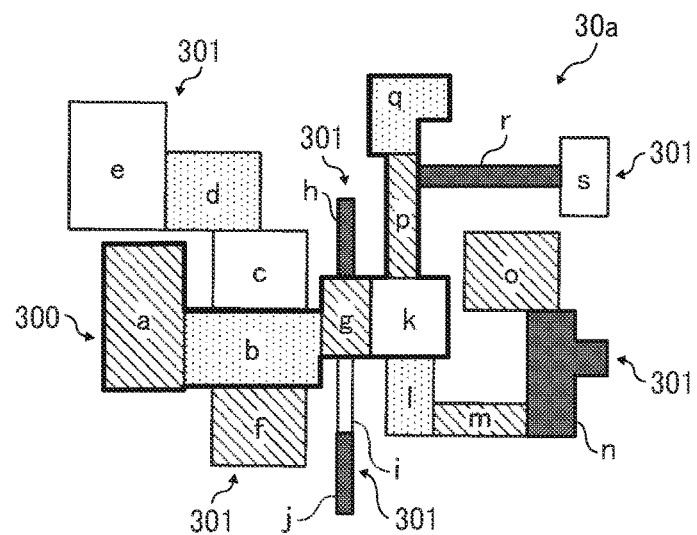
FIG. 31A illustrates an example of a configuration of an optically-readable symbol as a variant of the first embodiment.

FIG. 31 illustrates an example of a configuration of an optically-readable symbol 30*a* as a variant of the optically-readable symbol 30 of the first embodiment. In the variant of the first embodiment, as disclosed in FIG. 31A, the optically-readable symbol 30*a* is composed of a plurality of cells, in which the size of each of the cells is set differently, and each of the cells is connected to one or more other cells, and the number of cells arranged with a straight pattern is limited to three cells. Further, an alphabet is assigned to each cell as a label for each of the cells.

Figure 31B:
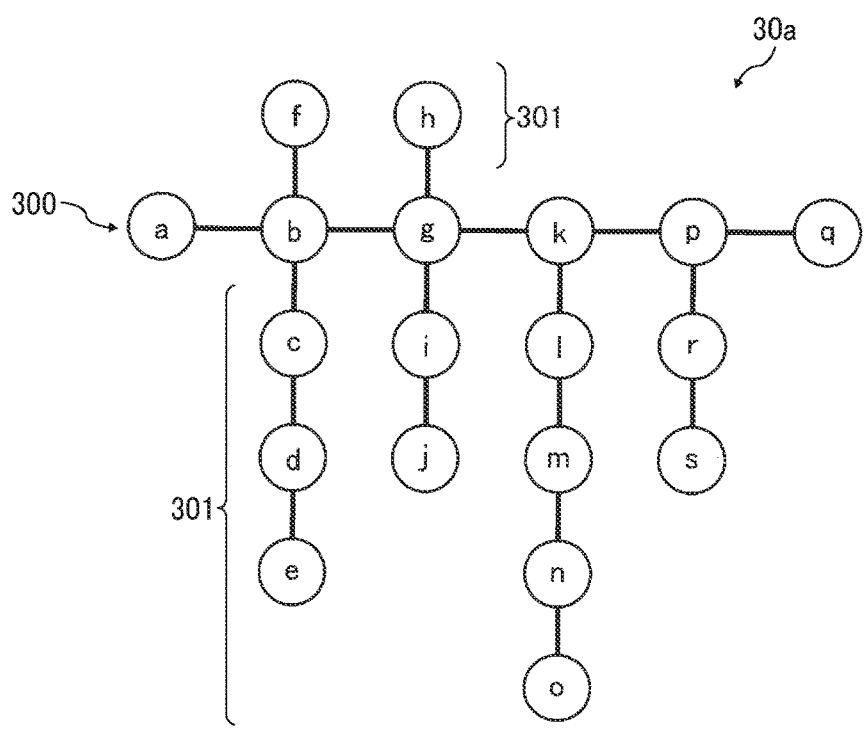
FIG. 31B schematically illustrates the optically-readable symbol of FIG. 31A.

FIG. 31B schematically illustrates the optically-readable symbol 30*a* of FIG. 31A, in which the label (e.g., alphabet) is encircled to indicate the cells. As described in FIG. 31B, the cell row of the main code 300 includes cells "a, b, g, k, p, q." In this example case, the cells "a" and "q" are respectively set as the start cell 302 and the end cell 303, and each of the cells "b, g, k, p" set between the cells "a" and "q" is connected to three or more other cells.

Further, as described in FIG. 31B, a plurality of cell columns of the sub-code 301 includes cells "c, d, e, i, j, l, m, n, o, r, s." The cell "c" is connected to the cell "b" of the main code 300, which means the cells "c, d, e" are connected to the cell "b" of the main code 300. The cell "i" is connected to the cell "g" of the main code 300, which means the cells "i, j" are connected to the cell "g" of the main code 300. The cell "l" is connected to the cell "k" of the main code 300, which means the cells "l, m, n, o" are connected to the cell "k" of the main code 300. The cell "r" is connected to the cell "p" of the main code 300, which means the cells "r, s" are connected to the cell "p" of the main code 300. Further, in an example case of FIG. 31B, the plurality of cell columns of the sub-code 301 includes cells "f" and "h." In this example case, the cell "f" is connected to the cell "b" of the main code 300 from a direction opposite to the cell column composed of cells "c, d, e," and the cell "h" is connected to the cell "g" of the main code 300 from a direction opposite to the cell column composed of cells "i, j." Further, the cells "f" and "h" are respectively set as the end cell of the cell columns of the sub-code 301.

Even if the cells of the optically-readable symbol 30*a* are configured with the non-straight pattern as described in FIG. 31A, each of the cell columns of the sub-code 301 is respectively connected to each of the cells of the main code 300, with which the recognition processing for each of the cell columns of the sub-code 301 can be performed in parallel or concurrently, with which the recognition processing can be performed faster.

Second Embodiment

A description is given of a second embodiment. As to the second embodiment, the optically-readable symbol 30 of the first embodiment is applied to a code management system and a conveyance system. FIG. 32 schematically illustrates the code management system and the conveyance system of the second embodiment. Some of the units described in FIG. 32 are same as the units described in FIGS. 1, 10 and 20, and the same references are assigned to the same units.

As described in FIG. 32, the code management system includes, for example, the code recognition apparatus 10, the code management apparatus 12, the code generation apparatus 20, and the printer 21 connected with each other via the network 13. Further, the conveyance system includes, for example, the code management system, and a conveyance control apparatus 14. The conveyance control apparatus 14 can be used to control a driving of a conveyance apparatus 51. For example, based on position or location information, the conveyance control apparatus 14 controls an operation of the conveyance apparatus 51 existing at a position or location corresponding to the position or location information to move the conveyance apparatus 51.

In an example case of FIG. 32, each one of the conveyance apparatuses 51 respectively loads each one of the articles 50. The base medium 40 displaying the optically-readable symbol 30 of the first embodiment is attached on an outer face (e.g., upper face) of each one of the articles 50. Each one of the optically-readable symbols 30 displayed on the base medium 40 attached to each one of the articles 50 is respectively encoded identification information used for identifying each one of the articles 50.

The code generation apparatus 20 is input with identification information used for identifying each one of the articles 50. The code generation apparatus 20 encodes the input identification information by applying, for example, the procedure of FIG. 13, to generate each one of the optically-readable symbols 30 respectively corresponding to each one of the articles 50. The code generation apparatus 20 prints the generated each one of the optically-readable symbols 30 respectively on each one of the base medium 40 by using the printer 21. The base medium 40 printed with the optically-readable symbol 30 is attached to each one of the articles 50 corresponding to the identification information encoded as the optically-readable symbol 30.

The code recognition apparatus 10 extracts each one of the optically-readable symbols 30 from the captured image 60 captured by the image capture device 11 by using the methods described with reference to FIGS. 23 to 30. Therefore, the code recognition apparatus 10 is used as the image acquisition unit that acquires the captured image 60 including the optically-readable symbol 30. Further, the code recognition apparatus 10 decodes the extracted each one of the optically-readable symbols 30 to restore the identification information encoded as the optically-readable symbol 30. Therefore, the code recognition apparatus 10 is also used as the identification information acquiring unit that acquires the identification information encoded as the optically-readable symbol 30. Further, the code recognition apparatus 10 acquires a position of each one of the optically-readable symbols 30 in the captured image 60 based on, for example, the coordinate of pixels acquired at the extraction process of the optically-readable symbol 30. Therefore, the code recognition apparatus 10 is also used as the position information acquiring unit that acquires the position of the optically-readable symbol 30.

The code recognition apparatus 10 transmits the identification information restored from each one of the optically-readable symbols 30 by performing the decoding, and the position information indicating the position of each one of the optically-readable symbols 30 to the code management apparatus 12. The code management apparatus 12 correlates the identification information and the position information received from the code recognition apparatus 10, and manages the correlated identification information and position information. In this configuration, it is assumed that the coordinate of the image capturing area of the captured image 60 and the coordinate of area where each one of the articles 50 is disposed are correlated in advance.

The conveyance control apparatus 14 is input, for example, the identification information of a specific article 50 and a movement instruction to move the specific article 50 from an external device or apparatus. The conveyance control apparatus 14 transmits the identification information to the code management apparatus 12, and requests the position information correlated to the identification information to the code management apparatus 12. When the code management apparatus 12 receives the request from the conveyance control apparatus 14, the code management apparatus 12 acquires the position information correlated to the identification information from the information managed by the code management apparatus 12, and transmits the position information to the conveyance control apparatus 14. The conveyance control apparatus 14 controls an operation of the conveyance apparatus 51 corresponding to the position information received from the code management apparatus 12 to move the conveyance apparatus 51.

[xxxx] 追加

Figure 33:
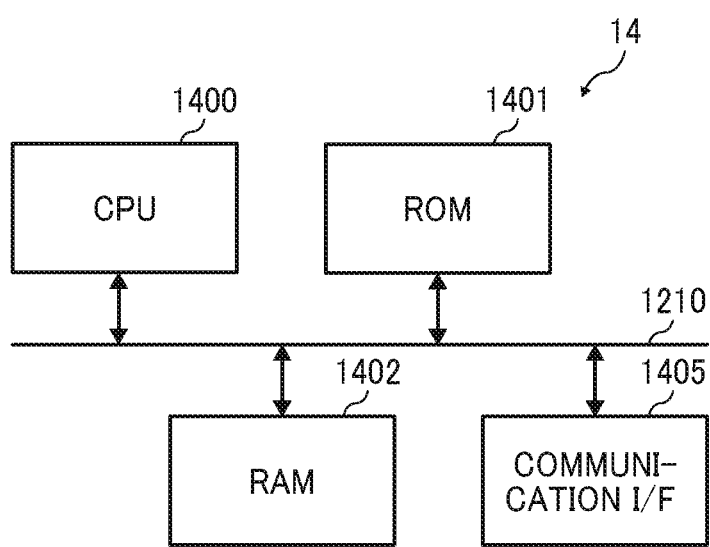
FIG. 33 illustrates an example of a hardware block diagram of a conveyance control apparatus used in the conveyance system of FIG. 32.

As described in FIG. 33, the conveyance control apparatus 14 includes, for example, a central processing unit (CPU) 1400, a read only memory (ROM) 1401, a random access memory (RAM) 1402, and a communication interface (I/F) 1405, which are communicably connected with each other via a bus 1410. The conveyance control apparatus 14 can be devised by using the hardware configuration of FIG. 33.

As to the code management system and the conveyance system of the second embodiment, the image capture device 11 captures each one of the optically-readable symbols 30 displayed on the base medium 40 attached to each one of the articles 50, with which the identification information encoded as each one of the optically-readable symbols 30 can be collectively acquired and managed. Therefore, the inventory management of each one of the articles 50 can be performed easily.

As to the above described embodiments, the recognition processing can be performed in parallel or concurrently, with which the recognition processing speed of the optically-readable symbol can be set faster.

Each of the functions of the described embodiments may be implemented by one or more processors, processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the apparatus, the system, and the processing method, a program to execute the processing method by a computer, and a storage or carrier medium of the program are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. A recognition apparatus comprising:
   one or more processors;
   a memory configured to store a plurality of instructions which, when executed by the one or more processors, cause the one or more processors to:
   extract an optically-readable symbol from an optically captured image including an image of the optically-readable symbol, the optically-readable symbol including a first cell line having a plurality of first cells, and one or more second cell lines each having one or more second cells, each of the one or more second cell lines connected to respective ones of the plurality of first cells of the first cell line;
recognize first information expressed by the first cell line included in the extracted optically-readable symbol;
recognize second information expressed by the one or more second cell lines included in the extracted optically-readable symbol;
synthesize the recognized first information and the recognized second information based on connection information of the first cells composing the first cell line and connection information of the one or more second cells in the one or more second cell lines; and
acquire identification information included in the optically-readable symbol based at least in part on the recognized first information and the recognized second information.

2. The recognition apparatus of claim 1, wherein the plurality of instructions stored in the memory further cause the one or more processors to:
recognize the second information respectively expressed by the one or more second cell lines by processing the one or more second cell lines in parallel.

3. The recognition apparatus of claim 1, wherein the plurality of instructions stored in the memory further cause the one or more processors to:
extract the optically-readable symbol based on a shape set for the optically-readable symbol.

4. The recognition apparatus of claim 1, wherein the plurality of instructions stored in the memory further cause the one or more processors to:
extract the optically-readable symbol based on color information of each of pixels in the optically captured image including the image of the optically-readable symbol.

5. The recognition apparatus of claim 1, wherein the plurality of instructions stored in the memory further cause the one or more processors to:
recognize one of the second cell lines and one of the first cells composing the first cell line connected to the one of the second cell lines as the second information.

6. The recognition apparatus of claim 5, wherein the plurality of instructions stored in the memory further cause the one or more processors to:
recognize a color transition between adjacent cells among the one or more of second cells composing one of the second cell lines and one of the first cells composing the first cell line connected to the one of the second cell lines as the second information.

7. The recognition apparatus of claim 5, wherein the plurality of instructions stored in the memory further cause the one or more processors to:
recognize the number of times of color transition between adjacent cells of the first cells composing the first cell line as the first information, and
recognize a value obtained by detecting a color transition between adjacent cells among the one or more of second cells composing one of the second cell lines and one of the first cells composing the first cell line connected to the one of the second cell lines as the second information.

8. The recognition apparatus of claim 1, wherein the plurality of instructions stored in the memory further cause the one or more processors to:
recognize a color transition between adjacent cells among the first cells composing the first cell line as the first information.

9. The recognition apparatus of claim 1, wherein the first information indicates the number of digits set for the identification information.

10. The recognition apparatus of claim 9, wherein the plurality of instructions stored in the memory further cause the one or more processors to:
recognize a sequential order of the first cells composing the first cell line as the first information to determine the number of digits set for the first cell line.

11. A management system comprising:
the recognition apparatus of claim 1; and
a management apparatus including circuitry, the circuitry being configured to:
acquire the optically captured image including an image of the optically-readable symbol, the optically-readable symbol being attached on a face of an article and including the first cell line and the one or more second cell lines that together express the identification information;
acquire the identification information based on the recognized first information and the recognized second information;
acquire position information indicating a position of the optically-readable symbol included in the optically captured image, and
correlate the identification information and the position information to manage the identification information and the position information in association.

12. A conveyance system comprising:
the management system of claim 11; and
a conveyance control apparatus to control an operation of a conveyance apparatus based on an instruction,
wherein the conveyance control apparatus receives the identification information from the management system, acquires a position indicated by the position information correlated to the identification information received from the management apparatus of the management system, and controls an operation of the conveyance apparatus locating at the position corresponding to the acquired position information.

13. A method of recognizing optically-readable information, the method comprising:
extracting an optically-readable symbol from an optically captured image including an image of the optically-readable symbol, the optically-readable symbol including a first cell line having a plurality of first cells, and one or more second cell lines each having one or more second cells, each of the one or more second cell lines connected to respective ones of the plurality of first cells of the first cell line;
recognizing first information expressed by the first cell line included in the extracted optically-readable symbol;
recognizing second information expressed by the one or more second cell lines included in the extracted optically-readable symbol;
synthesizing the recognized first information and the recognized second information based on connection information of the first cells composing the first cell line and connection information of the one or more second cells in the one or more second cell lines; and
acquiring identification information included in the optically-readable symbol based at least in part on the recognized first information and the recognized second information.

14. The method of claim 13, wherein the recognizing step recognizes the second information respectively expressed by the one or more second cell lines by processing the one or more second cell lines in parallel.

15. The method of claim 13, wherein the extracting step extracts the optically-readable symbol based on a shape set for the optically-readable symbol.

16. The method of claim 13, wherein the recognizing step recognizes one of the second cell lines and one of the first cells composing the first cell line connected to the one of the second cell lines as the second information.

17. The method of claim 13, wherein the recognizing step recognizes a color transition between adjacent cells among the first cells composing the first cell line as the first information.

18. A non-transitory storage medium storing one or more instructions that, when executed by one or more processors, cause the one or more processors to execute a method of recognizing optically-readable information, the method comprising:
   extracting an optically-readable symbol from an optically captured image including an image of the optically-readable symbol, the optically-readable symbol including a first cell line having a plurality of first cells, and one or more second cell lines each having one or more second cells, each of the one or more second cell lines connected to respective ones of the plurality of first cells of the first cell line;
   recognizing first information expressed by the first cell line included in the extracted optically-readable symbol;
   recognizing second information expressed by the one or more second cell lines included in the extracted optically-readable symbol;
   synthesizing the recognized first information and the recognized second information based on connection information of the first cells composing the first cell line and connection information of the one or more second cells in the one or more second cell lines; and
   acquiring identification information included in the optically-readable symbol based at least in part on the recognized first information and the recognized second information.

* * * * *